US011758229B2

(12) United States Patent
Sullivan et al.

(10) Patent No.: US 11,758,229 B2
(45) Date of Patent: *Sep. 12, 2023

(54) METHODS AND APPARATUS TO DETERMINE SYNTHETIC RESPONDENT LEVEL DATA

(71) Applicant: The Nielsen Company (US), LLC, New York, NY (US)

(72) Inventors: Jonathan Sullivan, Hurricane, UT (US); Michael D. Morgan, Bartlett, IL (US); Balachander Shankar, Tampa, FL (US); Edward Murphy, North Stonington, CT (US); Michael Sheppard, Holland, MI (US); Frank Downing, Orchard Park, NY (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,612

(22) Filed: Sep. 2, 2022

(65) Prior Publication Data

US 2023/0070980 A1 Mar. 9, 2023

Related U.S. Application Data

(63) Continuation of application No. 17/493,653, filed on Oct. 4, 2021, now Pat. No. 11,438,662, which is a
(Continued)

(51) Int. Cl.
*H04N 21/466* (2011.01)
*H04N 21/442* (2011.01)
(Continued)

(52) U.S. Cl.
CPC ......... *H04N 21/4667* (2013.01); *G06Q 30/02* (2013.01); *G06Q 30/0201* (2013.01);
(Continued)

(58) Field of Classification Search
None
See application file for complete search history.

(56) References Cited

U.S. PATENT DOCUMENTS 5,956,692 A 9/1999 Foley
6,108,637 A 8/2000 Blumenau
(Continued)

FOREIGN PATENT DOCUMENTS

JP 2015529870 10/2015
KR 20160087263 7/2016
(Continued)

OTHER PUBLICATIONS

Huckett et al., "Combining Methods to Create Synthetic Microdata: Quantile Regression, Hot Deck, and Rank Swapping," Research Gate, Apr. 2008, 11 pages.
(Continued)

*Primary Examiner* — Omar S Parra

(57) ABSTRACT

Methods, apparatus, systems, and articles of manufacture are disclosed to generate synthetic respondent level data. An example apparatus includes at least one memory; processor circuitry to execute instructions to: identify locations corresponding to monitored panelists; when a location of the identified locations corresponds to two or more affiliates, sum tuning minutes of the two or more affiliates; generate an affiliate probability based on the sum; convert first data of households in the location to a candidate receivability session based on the affiliate probability; generate a seed panel, the seed panel to include at least one of the monitored panelists selected based on a population associated with return path data; and donate second data associated with a donor pool of first panelists to second panelists included in
(Continued)

the seed panel when the second panelists are included in the seed panel, the second panelists corresponds to faulty media monitoring equipment.

20 Claims, 13 Drawing Sheets

Related U.S. Application Data continuation of application No. 16/805,361, filed on Feb. 28, 2020, now Pat. No. 11,140,449, which is a continuation of application No. 15/445,557, filed on Feb. 28, 2017, now Pat. No. 10,602,224.

(51) Int. Cl.
*H04N 21/81* (2011.01)
*H04N 21/258* (2011.01)
*H04N 21/61* (2011.01)
*H04N 21/239* (2011.01)
*G06Q 30/0201* (2023.01)
*G06Q 30/02* (2023.01)
*G06Q 30/0202* (2023.01)

(52) U.S. Cl.
CPC ..... *G06Q 30/0202* (2013.01); *G06Q 30/0206* (2013.01); *H04N 21/239* (2013.01); *H04N 21/25883* (2013.01); *H04N 21/25891* (2013.01); *H04N 21/44222* (2013.01); *H04N 21/6156* (2013.01); *H04N 21/812* (2013.01)

(56) References Cited

U.S. PATENT DOCUMENTS

| | | |
|---|---|---|
| 6,460,025 B1 | 10/2002 | Fohn |
| 6,775,663 B1 | 8/2004 | Kim |
| 7,197,472 B2 | 3/2007 | Conkwright |
| 7,746,272 B2 | 6/2010 | Vollath |
| 7,865,916 B2 | 1/2011 | Beser |
| 7,954,120 B2 | 5/2011 | Roberts |
| 8,087,041 B2 | 12/2011 | Fu |
| 8,112,301 B2 | 2/2012 | Harvey |
| 8,149,162 B1 | 4/2012 | Pauls |
| 8,171,032 B2 | 5/2012 | Herz |
| 8,185,456 B2 | 5/2012 | LeClair |
| 8,200,693 B2 | 6/2012 | Steele |
| 8,370,489 B2 | 2/2013 | Mazumdar |
| 8,423,406 B2 | 4/2013 | Briggs |
| 8,453,173 B1 | 5/2013 | Anderson |
| 8,619,892 B2 | 12/2013 | Vetter |
| 8,874,652 B1 | 10/2014 | Pecjak |
| 8,930,701 B2 | 1/2015 | Burbank |
| 8,973,023 B1 | 3/2015 | Rao |
| 9,070,139 B2 | 6/2015 | Zhang |
| 9,111,186 B2 | 8/2015 | Blasinski |
| 9,224,094 B2 | 12/2015 | Oliver |
| 9,236,962 B2 | 1/2016 | Hawkins |
| 9,237,138 B2 | 1/2016 | Bosworth |
| 9,420,320 B2 | 8/2016 | Doe |
| 9,529,836 B1 | 12/2016 | Hale |
| 10,045,057 B2 | 8/2018 | Shah |
| 10,070,166 B2 | 9/2018 | Chaar |
| 10,313,752 B2 | 6/2019 | Nagaraja Rao |
| 10,491,696 B2 | 11/2019 | Gierada |
| 10,602,224 B2 | 3/2020 | Sullivan |
| 10,728,614 B2 | 7/2020 | Sheppard |
| 10,743,064 B2 | 8/2020 | Berezowski |
| 10,856,027 B2 | 12/2020 | Sheppard |
| 11,115,710 B2 | 9/2021 | Sheppard |
| 11,140,449 B2 | 10/2021 | Sullivan |
| 11,216,834 B2 | 1/2022 | Sheppard |
| 11,323,772 B2 | 5/2022 | Sheppard |
| 11,425,458 B2 | 8/2022 | Sheppard |
| 11,438,662 B2 | 9/2022 | Sullivan |
| 11,483,606 B2 | 10/2022 | Sheppard |
| 11,523,177 B2 | 12/2022 | Sheppard |
| 2002/0123928 A1 | 9/2002 | Eldering |
| 2003/0037041 A1 | 2/2003 | Hertz |
| 2004/0001538 A1 | 1/2004 | Garrett |
| 2004/0059549 A1 | 3/2004 | Kropaczek |
| 2006/0190318 A1 | 8/2006 | Downey |
| 2007/0087756 A1 | 4/2007 | Hoffberg |
| 2008/0028006 A1 | 1/2008 | Liu |
| 2008/0228543 A1 | 9/2008 | Doe |
| 2008/0300965 A1 | 12/2008 | Doe |
| 2008/0313017 A1 | 12/2008 | Totten |
| 2010/0161385 A1 | 6/2010 | Karypis |
| 2010/0191723 A1 | 7/2010 | Perez |
| 2011/0196733 A1 | 8/2011 | Li |
| 2012/0023522 A1 | 1/2012 | Anderson |
| 2012/0052930 A1 | 3/2012 | McGucken |
| 2012/0066410 A1 | 3/2012 | Stefanakis |
| 2012/0072940 A1 | 3/2012 | Fuhrer |
| 2012/0110027 A1 | 5/2012 | Falcon |
| 2012/0254911 A1 | 10/2012 | Doe |
| 2013/0138743 A1 | 5/2013 | Amento |
| 2013/0198125 A1 | 8/2013 | Oliver |
| 2013/0254787 A1 | 9/2013 | Cox |
| 2013/0290233 A1 | 10/2013 | Ferren |
| 2013/0339991 A1 | 12/2013 | Ricci |
| 2013/0346033 A1 | 12/2013 | Wang |
| 2014/0101685 A1 | 4/2014 | Kitts |
| 2014/0112557 A1 | 4/2014 | Santamaria-Pang |
| 2014/0278933 A1 | 9/2014 | McMillan |
| 2014/0280891 A1 | 9/2014 | Doe |
| 2014/0337104 A1 | 11/2014 | Splaine |
| 2014/0358676 A1 | 12/2014 | Srivastava |
| 2015/0032310 A1 | 1/2015 | Zettel |
| 2015/0180989 A1 | 6/2015 | Seth |
| 2015/0186403 A1 | 7/2015 | Srivastava |
| 2015/0193813 A1 | 7/2015 | Toupet |
| 2015/0332310 A1 | 11/2015 | Cui |
| 2016/0012314 A1 | 1/2016 | Ramamurthy |
| 2016/0086208 A1 | 3/2016 | Oliver |
| 2016/0134934 A1 | 5/2016 | Jared |
| 2016/0162955 A1 | 6/2016 | O'Kelley |
| 2016/0165277 A1 | 6/2016 | Kirillov |
| 2016/0232563 A1 | 8/2016 | Perez |
| 2016/0249098 A1 | 8/2016 | Pecjak |
| 2016/0269783 A1 | 9/2016 | Mowrer |
| 2016/0323616 A1 | 11/2016 | Doe |
| 2016/0373820 A1 | 12/2016 | Meyer |
| 2016/0379246 A1 | 12/2016 | Sheppard |
| 2017/0006342 A1 | 1/2017 | Nagaraja Rao |
| 2017/0034594 A1 | 2/2017 | Francis |
| 2017/0155956 A1 | 6/2017 | Nagaraja Rao |
| 2017/0187478 A1 | 6/2017 | Shah |
| 2017/0213243 A1 | 7/2017 | Dollard |
| 2017/0300911 A1 | 10/2017 | Alnajem |
| 2018/0073933 A1 | 3/2018 | Keskin |
| 2018/0225709 A1 | 8/2018 | Ferber |
| 2018/0249208 A1 | 8/2018 | Sheppard |
| 2018/0249210 A1 | 8/2018 | Sheppard |
| 2018/0249211 A1 | 8/2018 | Sheppard |
| 2018/0249214 A1 | 8/2018 | Sullivan |
| 2018/0376198 A1 | 12/2018 | Sheppard |
| 2019/0147461 A1 | 5/2019 | Sheppard |
| 2019/0354574 A1 | 11/2019 | Wick |
| 2019/0356950 A1 | 11/2019 | Sheppard |
| 2019/0370860 A1 | 12/2019 | Morovati Lopez |
| 2020/0120387 A1 | 4/2020 | Sheppard |
| 2020/0204863 A1 | 6/2020 | Sullivan |
| 2020/0294069 A1 | 9/2020 | Sheppard |
| 2020/0296441 A1 | 9/2020 | Sheppard |
| 2020/0359090 A1 | 11/2020 | Sheppard |
| 2021/0014564 A1 | 1/2021 | Sheppard |
| 2021/0058659 A1 | 2/2021 | Sheppard |
| 2021/0065230 A1 | 3/2021 | Flynn |
| 2021/0133773 A1 | 5/2021 | Sheppard |
| 2021/0158377 A1 | 5/2021 | Sheppard |
| 2021/0319002 A1 | 10/2021 | Ryan |
| 2021/0319474 A1 | 10/2021 | Sheppard |

(56) References Cited

U.S. PATENT DOCUMENTS

| | | | |
|---|---|---|---|
| 2021/0400341 | A1 | 12/2021 | Sheppard |
| 2022/0038781 | A1 | 2/2022 | Sullivan |
| 2022/0058667 | A1 | 2/2022 | Sheppard |
| 2022/0058688 | A1 | 2/2022 | Sheppard |
| 2022/0122104 | A1 | 4/2022 | Sheppard |
| 2022/0159326 | A1 | 5/2022 | Sheppard |
| 2022/0264179 | A1 | 8/2022 | Sheppard |
| 2022/0264187 | A1 | 8/2022 | Sheppard |
| 2022/0408154 | A1 | 12/2022 | Sheppard |

FOREIGN PATENT DOCUMENTS

| | | |
|---|---|---|
| WO | 2008127737 | 10/2008 |
| WO | 2014210597 | 12/2014 |

OTHER PUBLICATIONS

Golub et al., "Linear Least Squares and Quadratic Programming," Technical Report No. CS 134, Stanford University, Computer Science Department, May 1969, 38 pages.

Charles L. Byrne, "Iterative Algorithms in Inverse Problems," Apr. 25, 2006, 347 pages.

Charles L. Byrne, "Applied Iterative Methods," Jan. 23, 2007, 396 pages.

Bourguignon et al., "On the Construction of Synthetic Panels," Oct. 2015, 42 pages.

Marno Verbeek, "Pseudo-Panels and Repeated Cross-Sections," The Econometrics of Panel Data, Springer-Verlag Berlin Heidelberg 2008, 15 pages.

P.J.G. Teunissen, "Least-Squares Estimation of the Integer GPS Ambiguities," Delft University of Technology, Department of the Geodetic Engineering, Aug. 1993, 16 pages.

United States Patent and Trademark Office, "Non-Final Office action" issued in connection with U.S. Appl. No. 15/445,543, dated Jan. 11, 2018, 19 pages.

United States Patent and Trademark Office, "Non-Final Office action" issued in connection with U.S. Appl. No. 15/445,530, dated Apr. 11, 2018, 10 pages.

United States Patent and Trademark Office, "Non-Final Office Action," issued in connection with U.S. Appl. No. 15/445,557, dated Jun. 29, 2018, 11 pages.

United States Patent and Trademark Office, "Non-Final Office action" issued in connection with U.S. Appl. No. 15/635,153, dated Feb. 5, 2018, 8 pages.

United States Patent and Trademark Office, "Notice of Allowance" issued in connection with U.S. Appl. No. 15/635,153, dated Jul. 23, 2018, 8 pages.

United States Patent and Trademark Office, "Final Office Action" issued in connection with U.S. Appl. No. 15/445,543, dated Aug. 3, 2018, 16 pages.

United States Patent and Trademark Office, "Non-Final Office Action," issued in connection with U.S. Appl. No. 15/619,257, dated Jun. 15, 2018, 15 pages.

United States Patent and Trademark Office, "Notice of Allowance," issued in connection with U.S. Appl. No. 15/635,153, dated Oct. 17, 2018, 5 pages.

United States Patent and Trademark Office, "Final Office Action" issued in connection with U.S. Appl. No. 15/445,557, dated Dec. 27, 2018, 10 pages.

United States Patent and Trademark Office, "Non-Final Office Action," issued in connection with U.S. Appl. No. 15/445,543, dated Jan. 8, 2019, 15 pages.

United States Patent and Trademark Office, "Notice of Allowance," issued in connection with U.S. Appl. No. 15/445,530, dated Jan. 2, 2019, 7 pages.

United States Patent and Trademark Office, "Final Office Action" issued in connection with U.S. Appl. No. 15/619,257, dated Jan. 18, 2019, 18 pages.

United States Patent and Trademark Office, "Notice of Allowance," issued in connection with U.S. Appl. No. 15/635,153, dated Mar. 21, 2019, 7 pages.

United States Patent and Trademark Office, "Notice of Allowability," issued in connection with U.S. Appl. No. 15/635,153, dated Apr. 8, 2019, 2 pages.

United States Patent and Trademark Office, "Notice of Allowance," issued in connection with U.S. Appl. No. 15/445,557, dated Apr. 15, 2019, 8 pages.

United States Patent and Trademark Office, "Notice of Allowance," issued in connection with U.S. Appl. No. 15/445,530, dated May 3, 2019, 5 pages.

United States Patent and Trademark Office, "Notice of Allowability," issued in connection with U.S. Appl. No. 15/445,530, dated May 21, 2019, 2 pages.

United States Patent and Trademark Office, "Notice of Allowance," issued in connection with U.S. Appl. No. 15/445,557, dated Jul. 26, 2019, 7 pages.

United States Patent and Trademark Office, "Notice of Allowance and Fee(s) Due" issued in connection with U.S. Appl. No. 15/445,557, dated Nov. 5, 2019, 9 pages.

United States Patent and Trademark Office, "Final Office Action" issued in connection with U.S. Appl. No. 15/445,543, dated Jul. 18, 2019, 12 pages.

United States Patent and Trademark Office, "Notice of Allowance and Fee(s) Due," issued in connection with U.S. Appl. No. 15/445,530, dated Sep. 25, 2019, 5 pages.

Haggin, Patience et al., "Google Nears a Long-Tipped Limit on Tracking "Cookies," in Blow to Rivals," The Wall Street Journal, May 6, 2019, obtained from https://www.wsj.com/articles/googles-new-privacy-tools-to-make-cookies-crumble-competitors-stumble-11557151913, 3 pages.

United States Patent and Trademark Office, "Notice of Allowance," issued in connection with U.S. Appl. No. 15/445,530, dated Jan. 31, 2020, 10 pages.

International Searching Authority. "International Search Report & Written Opinion", issued in connection with application No. PCT/US2020/022438 dated Jul. 6, 2020, 10 pages.

International Searching Authority. "International Search Report & Written Opinion," issued in connection with application No. PCT/US2020/022436 dated Jul. 6, 2020, 9 pages.

United States Patent and Trademark Office, "Final Office Action," issued in connection with U.S. Appl. No. 16/526,747, dated Dec. 30, 2020, 9 pages.

United States Patent and Trademark Office, "Non-Final Office Action," issued in connection with U.S. Appl. No. 16/355,386, dated Nov. 9, 2020, 8 pages.

United States Patent and Trademark Office, "Non-Final Office Action," issued in connection with U.S. Appl. No. 16/526,747, dated Jul. 23, 2020, 8 pages.

United States Patent and Trademark Office, "Non-Final Office Action," issued in connection with U.S. Appl. No. 16/657,652, dated Oct. 27, 2020, 18 pages.

United States Patent and Trademark Office, "Notice of Allowance," issued in connection with U.S. Appl. No. 16/355,393, dated Jul. 8, 2020, 8 pages.

United States Patent and Trademark Office, "Non-Final Office Action," issued in connection with U.S. Appl. No. 16/893,129, dated Apr. 13, 2021, 8 pages.

United States Patent and Trademark Office, "Notice of Allowance," issued in connection with U.S. Appl. No. 16/526,747, dated Apr. 28, 2021, 8 pages.

United States Patent and Trademark Office, "Final Office Action," issued in connection with U.S. Appl. No. 16/355,386, dated May 4, 2021, 10 pages.

United States Patent and Trademark Office, "Notice of Allowance," issued in connection with U.S. Appl. No. 16/805,361, dated Feb. 18, 2021, 8 pages.

United States Patent and Trademark Office, "Final Office Action," issued in connection with U.S. Appl. No. 16/657,652, dated May 14, 2021, 19 pages.

(56) References Cited

OTHER PUBLICATIONS

United States Patent and Trademark Office, "Non-Final Office Action," issued in connection with U.S. Appl. No. 16/939,996, dated Jun. 24, 2021, 15 pages.
United States Patent and Trademark Office, "Non-Final Office Action," issued in connection with U.S. Appl. No. 16/843,650, dated May 26, 2021, 26 pages.
United States Patent and Trademark Office, "Notice of Allowance" issued in connection with U.S. Appl. No. 15/619,257, dated Mar. 17, 2020, 8 pages.
United States Patent and Trademark Office, "Corrected Notice of Allowability," issued in connection with U.S. Appl. No. 16/526,747, dated Aug. 11, 2021, 3 pages.
United States Patent and Trademark Office, "Advisory Action," issued in connection with U.S. Appl. No. 16/657,652, dated Aug. 19, 2021, 4 pages.
United States Patent and Trademark Office, "Notice of Allowance," issued in connection with U.S. Appl. No. 16/893,129, dated Jul. 29, 2021, 5 pages.
United States Patent and Trademark Office, "Notice of Allowance," issued in connection with U.S. Appl. No. 16/355,386, dated Aug. 30, 2021, 7 pages.
United States Patent and Trademark Office, "Notice of Allowance," issued in connection with U.S. Appl. No. 16/805,361, dated Jun. 3, 2021, 8 pages.
United States Patent and Trademark Office, "Non-Final Office Action," issued in connection with U.S. Appl. No. 16/657,652, dated Oct. 18, 2021, 22 pages.
International Searching Authority. "International Preliminary Report on Patentability", issued in connection with application No. PCT/US2020/022438 dated Sep. 16, 2021, 6 pages.
International Searching Authority. "International Preliminary Report on Patentability", issued in connection with application No. PCT/US2020/022436 dated Sep. 16, 2021, 5 pages.
United States Patent and Trademark Office, "Non-Final Office Action," issued in connection with U.S. Appl. No. 17/093,460, dated Oct. 22, 2021, 5 pages.
United States Patent and Trademark Office, "Non-Final Office Action," issued in connection with U.S. Appl. No. 16/676,158, dated Nov. 29, 2021, 24 pages.
United States Patent and Trademark Office, "Notice of Allowance," issued in connection with U.S. Appl. No. 16/893,129, dated Dec. 14, 2021, 5 pages.
United States Patent and Trademark Office, "Corrected Notice of Allowability," issued in connection with U.S. Appl. No. 16/355,386, dated Dec. 9, 2021, 2 pages.
United States Patent and Trademark Office, "Final Office Action," issued in connection with U.S. Appl. No. 16/939,996, dated Dec. 16, 2021, 19 pages.
United States Patent and Trademark Office, "Final Office Action," issued in connection with U.S. Appl. No. 16/843,650, dated Dec. 17, 2021, 33 pages.
United States Patent and Trademark Office, "Notice of Allowance and Fee(s) Due," issued in connection with U.S. Appl. No. 17/093,460, dated Mar. 1, 2022, 9 pages.
United States Patent and Trademark Office, "Non-Final Office Action," issued in connection with U.S. Appl. No. 17/408,208, dated Jan. 5, 2022, 19 pages.
United States Patent and Trademark Office, "Notice of Allowance," issued in connection with U.S. Appl. No. 16/939,996, dated Mar. 11, 2022, 8 pages.
United States Patent and Trademark Office, "Non-Final Office Action," issued in connection with U.S. Appl. No. 17/099,510, dated Mar. 29, 2022, 6 pages.
United States Patent and Trademark Office, "Non-Final Office Action," issued in connection with U.S. Appl. No. 16/676,158, dated Mar. 18, 2022, 29 pages.
United States Patent and Trademark Office, "Corrected Notice of Allowability," issued in connection with U.S. Appl. No. 16/893,129, dated Dec. 22, 2021, 2 pages.

International Searching Authority. "International Search Report & Written Opinion," issued in connection with application No. PCT/US21/26010 dated Jul. 26, 2021, 8 pages.
United States Patent and Trademark Office, "Corrected Notice of Allowability," issued in connection with U.S. Appl. No. 16/893,129, dated Apr. 8, 2022, 2 pages.
United States Patent and Trademark Office, "Notice of Allowance and Fee(s) Due," issued in connection with U.S. Appl. No. 16/657,652, dated Apr. 12, 2022, 8 pages.
United States Patent and Trademark Office, "Final Office Action," issued in connection with U.S. Appl. No. 17/408,208, dated Apr. 20, 2022, 26 pages.
Esch et al., "Appendix 8 Numerical Methods for Solving Nonlinear Equations," Asset and Risk Management: Risk Oriented Finance, published 2005 by John Wiley & Sons Ltd., 7 pages.
United States Patent and Trademark Office, "Notice of Allowance and Fee(s) Due," issued in connection with U.S. Appl. No. 17/493,653, dated Apr. 29, 2022, 8 pages.
United States Patent and Trademark Office, "Supplemental Notice of Allowability," issued in connection with U.S. Appl. No. 17/493,653, dated May 26, 2022, 2 pages.
United States Patent and Trademark Office, "Notice of Allowance and Fee(s) Due," issued in connection with U.S. Appl. No. 17/093,460, dated Jun. 10, 2022, 9 pages.
United States Patent and Trademark Office, "Notice of Allowance and Fee(s) Due," issued in connection with U.S. Appl. No. 16/939,996, dated Aug. 5, 2022, 8 pages.
United States Patent and Trademark Office, "Final Office Action," issued in connection with U.S. Appl. No. 16/676,158, dated Jul. 29, 2022, 30 pages.
United States Patent and Trademark Office, "Corrected Notice of Allowability," issued in connection with U.S. Appl. No. 16/657,652, dated Jul. 29, 2022, 3 pages.
United States Patent and Trademark Office, "Non-Final Office Action," issued in connection with U.S. Appl. No. 16/843,650, dated Jul. 29, 2022, 36 pages.
International Searching Authority, "International Search Report and Written Opinion," issued in connection with PCT Application No. PCT/US2022/015516, dated May 26, 2022, 7 pages.
United States Patent and Trademark Office, "Non-Final Office Action," issued in connection with U.S. Appl. No. 17/666,359, dated Aug. 18, 2022, 8 pages.
United States Patent and Trademark Office, "Non-Final Office Action," issued in connection with U.S. Appl. No. 17/408,208, dated Aug. 15, 2022, 24 pages.
United States Patent and Trademark Office, "Notice of Allowance and Fee(s) Due," issued in connection with U.S. Appl. No. 17/099,510, dated Aug. 24, 2022, 7 pages.
United States Patent and Trademark Office, "Supplemental Notice of Allowability," issued in connection with U.S. Appl. No. 17/099,510, dated Sep. 7, 2022, 2 pages.
United States Patent and Trademark Office, "Corrected Notice of Allowability," issued in connection with U.S. Appl. No. 16/939,996, dated Aug. 26, 2022, 3 pages.
United States Patent and Trademark Office, "Advisory Action," issued in U.S. Appl. No. 16/676,158, dated Oct. 6, 2022, 4 pages.
United States Patent and Trademark Office, "Non-Final Office Action," issued in connection with U.S. Appl. No. 17/734,792, dated Oct. 13, 2022, 6 pages.
United States Patent and Trademark Office, "Non-Final Office Action," issued in connection with U.S. Appl. No. 17/567,710, dated Oct. 14, 2022, 8 pages.
International Searching Authority, "International Preliminary Report on Patentability", issued in connection with application No. PCT/US2021/026010 dated Oct. 6, 2022, 6 pages.
United States Patent and Trademark Office, "Non-Final Office Action," issued in connection with U.S. Appl. No. 17/666,359, dated Nov. 18, 2022, 9 pages.
United States Patent and Trademark Office, "Non-Final Office Action," issued in connection with U.S. Appl. No. 17/465,567, dated Nov. 16, 2022, 12 pages.

(56) References Cited

OTHER PUBLICATIONS

United States Patent and Trademark Office, "Non-Final Office Action," issued in connection with U.S. Appl. No. 16/843,650, dated Dec. 2, 2022, 43 pages.
United States Patent and Trademark Office, "Final Office Action," issued in connection with U.S. Appl. No. 17/408,208, dated Dec. 8, 2022, 10 pages.

METHODS AND APPARATUS TO DETERMINE SYNTHETIC RESPONDENT LEVEL DATA

RELATED APPLICATION

This patent arises from a continuation of U.S. patent application Ser. No. 17/493,653, which is titled "METHODS AND APPARATUS TO DETERMINE SYNTHETIC RESPONDENT LEVEL DATA," which was filed on Oct. 4, 2021, which is a continuation of U.S. patent application Ser. No. 16/805,361, which is titled "METHODS AND APPARATUS TO DETERMINE SYNTHETIC RESPONDENT LEVEL DATA," which was filed on Feb. 28, 2020, which is a continuation of U.S. patent application Ser. No. 15/445,557, which is titled "METHODS AND APPARATUS TO DETERMINE SYNTHETIC RESPONDENT LEVEL DATA," and which was filed on Feb. 28, 2017. Priority to U.S. patent application Ser. No. 17/493,653, U.S. patent application Ser. No. 16/805,361 and U.S. patent application Ser. No. 15/445,557 is claimed. U.S. patent application Ser. No. 17/493,653, U.S. patent application Ser. No. 16/805,361 and U.S. patent application Ser. No. 15/445,557 re incorporated herein by reference in their entireties.

FIELD OF THE DISCLOSURE

This disclosure relates generally to media audience measurement, and, more particularly, to methods and apparatus to determine synthetic respondent level data.

BACKGROUND

Determining a size and demographic of an audience of a media presentation helps media providers and distributors schedule programming and determine a price for advertising presented during the programming. In addition, accurate estimates of audience demographics enable advertisers to target advertisements to certain types and sizes of audiences. To collect these demographics, an audience measurement entity enlists a plurality of media consumers (often called panelists) to cooperate in an audience measurement study (often called a panel) for a predefined length of time. In some examples, the audience measurement entity obtains (e.g., directly, or indirectly via a service provider) return path data from media presentation devices (e.g., set-top boxes) that identifies tuning data from the media presentation device. In such examples, the audience measurement entity models and/or assigns viewers based on the return path data. The media consumption habits and demographic data associated with these enlisted media consumers are collected and used to statistically determine the size and demographics of the entire audience of the media presentation. In some examples, this collected data (e.g., data collected via measurement devices) may be supplemented with survey information, for example, recorded manually by the presentation audience members.

DETAILED DESCRIPTION

Figure 1:
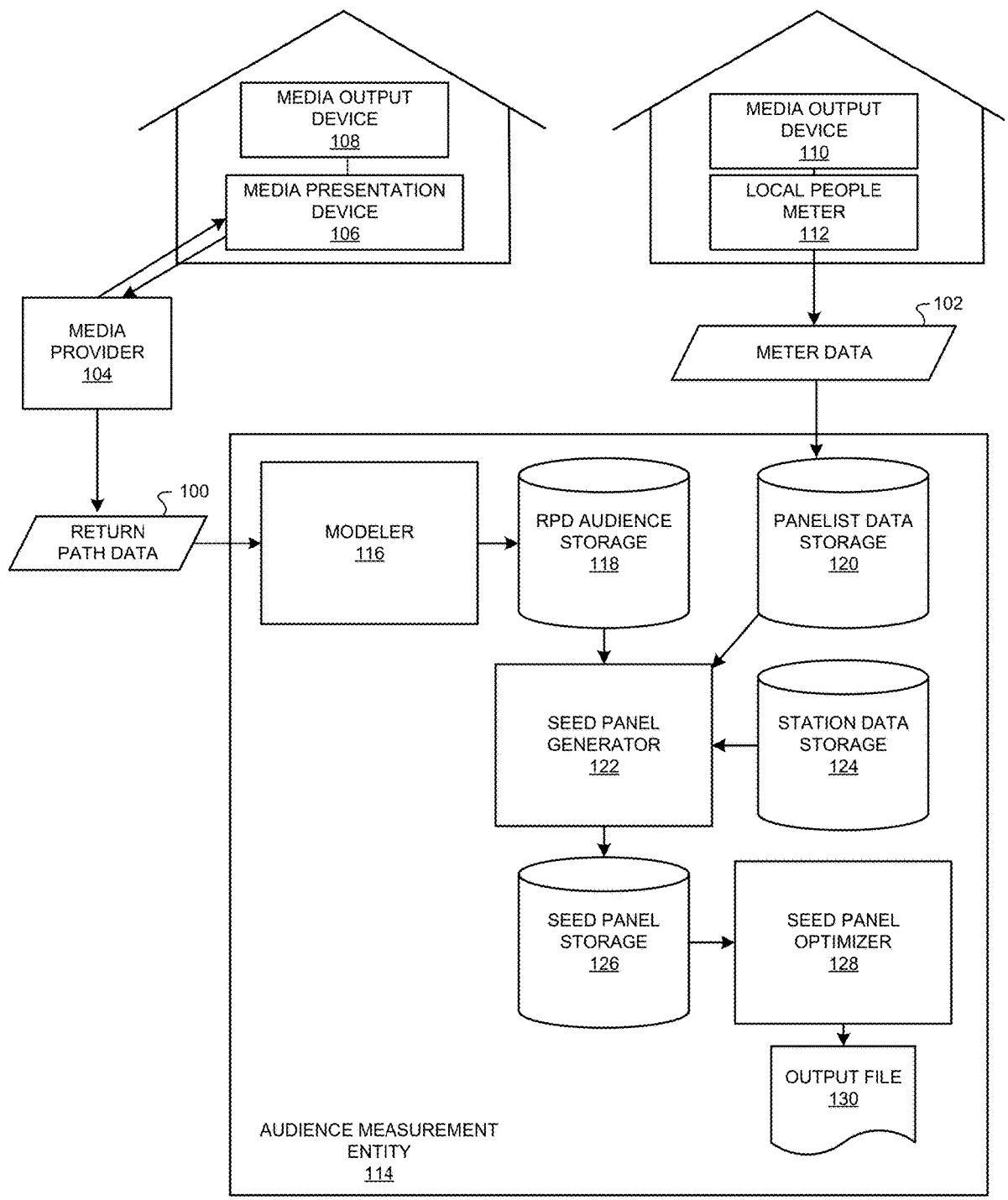
FIG. 1 is a block diagram of an example environment in which return path data and meter data are collected from media presentation locations and are analyzed by an example audience measurement entity to generate an example seed panel and generate example synthetic respondent level data based on the example seed panel.

Audience measurement entities seek to understand the composition and size of audiences of media, such as television programming. Such information allows audience measurement entity researchers to, for example, report advertising delivery and/or targeting statistics to advertisers that target their media (e.g., advertisements) to particular audiences. Additionally, such information helps to establish advertising prices commensurate with audience exposure and demographic makeup (referred to herein collectively as "audience configuration"). One way to gather media presentation information is to gather media presentation information from media output devices (e.g., gathering television presentation data from a set-top box (STB) connected to a television). As used herein, media presentation includes media output by a media device regardless of whether or not an audience member is present (e.g., media output by a media output device at which no audience is present, media exposure to an audience member(s), etc.).

A media presentation device (e.g., STB) provided by a service provider (e.g., a cable television service provider, a satellite television service provider, an over the top service provider, a music service provider, a movie service provider, a streaming media provider, etc.) or purchased by a consumer may contain processing capabilities to monitor, store, and transmit tuning data (e.g., which television channels are tuned by the media presentation device at a particular time) to an audience measurement entity (e.g., The Nielsen Company (US), LLC.) to analyze media presentation activity. Data transmitted from a media presentation device back to a service provider providing the media (which may then aggregate and provide the return path data to an audience measurement entity) is herein referred to as return path data. Return path data includes tuning data. Tuning data is based on data received from the media presentation device while the media presentation device is on (e.g., powered on, switched on, and/or tuned to a media channel, streaming, etc.). Although return path data includes tuning data, return path data may not include data (e.g., demographic data) related to the user viewing the media corresponding to the media presentation device. Accordingly, return path data may not be associated with particular viewers, demographics, locations, etc.

To determine aspects of media presentation data (e.g., which household member is currently consuming a particular media and the demographics of that household member), market researchers may perform audience measurement by enlisting a subset of the media consumers as panelists. Panelists or monitored panelists are audience members (e.g., household members, users, panelists, etc.) enlisted to be monitored, who divulge and/or otherwise share their media activity and/or demographic data to facilitate a market research study. An audience measurement entity typically monitors media presentation activity (e.g., viewing, listening, etc.) of the monitored panelists via audience measurement system(s), such as a metering device(s) and/or a local people meter (LPM). Audience measurement typically includes determining the identity of the media being presented on a media output device (e.g., a television, a radio, a computer, etc.), determining data related to the media (e.g., presentation duration data, timestamps, channel data, etc.), determining demographic information of an audience, and/or determining which members of a household are associated with (e.g., have been exposed to) a media presentation. For example, an LPM in communication with an audience measurement entity communicates audience measurement (e.g., metering) data to the audience measurement entity. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In some examples, metering data (e.g., including media presentation data) collected by an LPM or other meter is stored in a memory and transmitted via a network, such as the Internet, to a datastore managed by the audience measurement entity. Typically, such metering data is combined with additional metering data collected from a plurality of LPMs monitoring a plurality of panelist households. The metering data may include, but are not limited to, a number of minutes a household media presentation device was tuned to a particular channel, a number of minutes a household media presentation device was used (e.g., consumed) by a household panelist member and/or a visitor (e.g., a presentation session), demographics of the audience (which may be statistically projected based on the panelist data), information indicative of when the media presentation device is on or off, and/or information indicative of interactions with the media presentation device (e.g., channel changes, station changes, volume changes, etc.), etc. As used herein, a channel may be a tuned frequency, selected stream, an address for media (e.g., a network address), and/or any other identifier for a source and/or carrier of media.

Return path data provides valuable media exposure data, including media exposure data in locations where no panel data is available. However, return path data typically contains tuning data in the aggregate. Accordingly, return path data usually does not include respondent level data such as, but not limited to, detailed data relating to audience demographics and/or viewing data broken up into margins (e.g., quarter hours). Examples disclosed herein alleviate the lack of respondent level data in return path data by leveraging the respondent level data obtained from a panel of monitored panelists. Using examples disclosed herein, synthetic respondent level data corresponding to a group of synthetic, or virtual, panelists may be generated to correspond to the return path data, thereby increasing the value of return path data to a customer (e.g., of an advertising company).

Examples disclosed herein process the collected and/or aggregated metering data for markets where a panel is maintained and collect and/or aggregate return path data for markets where a panel is not maintained to generate a seed panel. A seed panel is a synthetic panel including monitored panelists and non-panelist selected to correspond to return path data homes (e.g., in-market return path data) and regional panel homes (e.g., over the air only panelists) and used as the basis for generation of synthetic respondent level data (e.g., representative of a group synthetic/virtual panelists) based on a similarity to the segment of the market that is not covered by return path data. These monitored panelists are selected from a panel (e.g., a national panel of metered users) based on a regional proximity to a designated market area, a similarity between demographics of the monitored panelist and demographics of the return path data audience location, household media characteristics (e.g., how the households receive television signals (cable, satellite, over-the-air radio, etc.)), a similarity between media consumption of the monitored panelists and the return path data audience, etc. As used herein, a return path data audience is viewer assigned return path data associated with a population (e.g., a universe or users) and/or location. As used herein, a seed panelist is a monitored panelist that has been selected to be included in a seed panel. As used herein, synthetic respondent level data or respondent level data is processed viewing data at the level of individual respondents. Synthetic respondent level data may include complete time records (e.g., at the quarter hour level, hour level, etc.) across each broadcasting day of all viewing session by every family member and guest on all metered media output devices in a home including the demographic data. As used herein, designated market area is a geographical area that defines a media market where synthetic respondent level data is produced.

Once a seed panel has been generated, examples disclosed herein adjust the seed panel to satisfy target ratings and/or target reach. As used herein, a rating is an average percentage of a population exposed to media across a set time interval. As used herein, reach is a cumulative percentage or total of a population that has been counted as a viewer of media at least once during a specified time interval (e.g., daily, weekly, monthly, etc.). Examples disclosed herein adjust the seed panel by adjusting weights of seed panelists corresponding to the target rating and/or reach (such as the target rating and/or reach represented by the aggregate return path data) until the target rating and/or reach is satisfied. For example, if the target rating (e.g., corresponding to a rating reflected in the aggregate return path data) is 25% of men exposed to a first program during a first duration of time and 30% of the generated seed panel men were exposed to the first program during the first duration of time, examples disclosed herein adjust the seed panel to reduce the current rating (e.g., 30%) to a rating closer to the target rating (e.g., 25%). Examples disclosed herein generate an output file including synthetic respondent level data for the adjusted seed panelists corresponding to the target rating. Using examples disclosed herein, consistent respondent level data is generated that satisfy various targets, thereby providing more accurate universe estimations.

FIG. 1 is a block diagram of an environment in which example return path data 100 and example meter data 102 are collected to generate synthetic respondent level data based on a generated seed panel. FIG. 1 includes the example return path data 100, the example meter data 102, an example media provider 104, an example media presentation device 106, example media output devices 108, 110, an example local people meter (LPM) 112, and an example audience measurement entity (AME) 114. The example audience measurement entity 114 includes an example modeler 116, an example return path data (RPD) audience storage 118, an example panelist data storage 120, an example seed panel generator 122, an example station data storage 124, an example seed panel storage 126, an example seed panel optimizer 128, and an example output file 130.

The example media provider 104 of FIG. 1 is a service provider (e.g., cable media service provider, a radio frequency (RF) media provider, a satellite media service provider, etc.) that presents media to an audience member via the example media presentation device 106. The media provided by the example media provider 104 is transmitted (e.g., via a wired or wireless network connection) to the media presentation device 106. The media presentation device 106 is connected, via a wired or wireless connection, to the example media output device 108 to output the media to an audience member. The media output device 108 is a device capable of outputting the received media. For example, the media output device 108 may be a television, a radio, speakers, a projector, a computer, a computing device, a tablet, a mobile device, and/or any other device capable of outputting media.

When the example media presentation device 106 of FIG. 1 is on, the media presentation device 106 receives media corresponding to a station, program, website, etc. based on the tuning of the example media presentation device 106. For example, the media presentation device 106 may be a set-top box. Additionally or alternatively, the example media presentation device 106 may be an over the top device, a video game console, a digital video recorder (DVR), a digital versatile disc (DVD) player, a receiver, a router, a server, a computer, a mobile device, a smart television, and/or any device that receives media from a service provider. In some examples, the media presentation device 106 may implement a DVR and/or DVD player. In some examples, the example media presentation device 106 includes a unique serial number that, when associated with subscriber information, allows an audience measurement entity, a marketing entity, and/or any other entity to ascertain specific subscriber behavior information.

By way of example, the example media presentation device 106 may be tuned to channel 5. In such an example, the media presentation device 106 outputs media (from the example media provider 104) corresponding to the tuned channel 5. The media presentation device 106 may gather tuning data corresponding to which channels, stations, websites, etc. that the example media presentation device 106 was tuned. The example media presentation device 106 generates and transmits the example return path data 100 to the example media provider 104. The example return path data 100 includes the tuning data and/or data corresponding to the example media provider 104 (e.g., data in the aggregate). Although the illustrated example of FIG. 1 includes the example media provider 104 receiving the example return path data 100 from one media presentation device (e.g., the example media presentation device 106), at one location, corresponding to one media provider (e.g., the example media provider 104), the example media provider 104 may receive return path data 100 from any number or type(s) of media presentation devices, at any number of locations. The media provider 104 transmits the collected return path data 100 to the example audience measurement entity 114. Additionally or alternatively, the audience measurement entity 114 may be hosted by any other entity or may be co-hosted by another entity(ies). For example, the example return path data 100 may be collected from the example media presentation devices 106 by a media provider (e.g., a cable television provider, a satellite television provider, etc.) and the example meter data 102 may be collected from an LPM (e.g., such as the example LPM 112) by the example audience measurement entity 114 cooperating with the media provider to gain access to the tuning data. The example audience measurement entity 114 includes the example return path data audience storage 118 (e.g., a database) and the example panelist data storage 120 (e.g., a database).

The example media output device 110 of FIG. 1 is a device capable of outputting the received media. For example, the media output device 110 may be a television, a radio, speakers, a projector, a computer, a computing device, a tablet, a mobile device, and/or any other device capable of outputting media. In some examples, the media output device 110 receives media over-the-air. In this manner, the media output device 110 receives media via an antenna and does not correspond to a media provider (e.g., including the example media provider 104). In the illustrated example of FIG. 1, the media output device 110 corresponds to one or more monitored panelists. The example LPM 112 monitors the panelists exposure to media output by the example media output device 110. For example, the example LPM 112 is in communication with the example media output device 110 to collect and/or capture signals emitted externally by the media output device 110. The LPM 112 may be coupled with the media output device 110 via wired and/or wireless connection. The example LPM 112 may be implemented in connection with additional and/or alternative types of media presentation devices, such as, for example, a radio, a computer monitor, a video game console, and/or any other device capable to present media to a user. The LPM 112 may be a portable people meter, a cell phone, a computing device, a sensor, and/or any other device capable of metering (e.g., monitoring) user exposure to media. In some examples, a media presentation location may include a plurality of LPMs 112. In such examples, the plurality of the LPMs 112 may be used to monitor media exposure for multiple users and/or media output devices 110. Additionally, the example panelist data storage 120 receives and stores the example meter data 102 from the example LPM 112.

In some examples, the example LPM 112 of FIG. 1 includes a set of buttons assigned to audience members to determine which of the audience members is watching the example media output device 110. The LPM 112 may periodically prompt the audience members via a set of LEDs, a display screen, and/or an audible tone, to indicate that the audience member is present at a first media presentation location by pressing an assigned button. In some examples, to decrease the number of prompts and, thus, the number of intrusions imposed upon the media consumption experience of the audience members, the LPM 112 prompts only when unidentified audience members are located at the first media presentation location and/or only after the LPM 112 detects a channel change and/or a change in state of the media output device 110. In other examples, the LPM 112 may include at least one sensor (e.g., a camera, 3-dimensional sensor, etc.) and/or be communicatively coupled to at least one sensor that detects a presence of the user in a first example media presentation location. The example LPM 112 transmits the example meter data 102 to a media researcher and/or a marketing entity. The example meter data 102 includes the media presentation data (e.g., data related to media presented while the media output device 110 is on and a user is present). The example meter data 102 may further include a household identification, a tuner key, a presentation start time, a presentation end time, a channel key, etc. Although the illustrated example illustrates the example audience measurement entity 114 collecting the example meter data 102 from one LPM 112 at one location, the example audience measurement entity 114 may collect meter data from any number or type of meters at any number of locations.

The example return path data 100 of FIG. 1 from the example media presentation device 106 and/or the example meter data 102 from the example LPM 112 is transmitted to the example audience measurement entity 114 via a network. The network may be implemented using any type of public or private network, such as, but not limited to, the Internet, a telephone network, a local area network (LAN), a cable network, and/or a wireless network. To enable communication via the network, the example media presentation device 106 includes a communication interface that enables a connection to an Ethernet, a digital subscriber line (DSL), a telephone line, a coaxial cable, or any wireless connection, etc.

The example modeler 116 of the example AME 114 of FIG. 1 collects the example return path data 100 corresponding to the example media presentation device(s) 106. As described above, the example return path data 100 includes tuning data of the example media presentation device 106. However, the example return path data 100 may not include specific data identifying any information relating to the audience of the example media output device 108. The example modeler 116 models such audience information. For example, the modeler 116 may assign and/or model virtual users to augment the example return path data 100, thereby generating audience (e.g., viewer or listener) assigned return path data. The example modeler 116 outputs the audience assigned return path data to the example return path data audience storage 118.

The example seed panel generator 122 of FIG. 1 gathers (A) the audience assigned return path data from the example return path data audience storage 118, (B) the example meter data 102 from the example panelist data storage 120, (C) and station data from the example station data storage 124 to generate a seed panel. As explained above, a seed panel is a panel including synthetic respondent level data from monitored panelists corresponding to the LPM(s) 112, which are selected based on a return path data audience and/or homes and regional panel audience and/or homes that are not covered by return path data. The seed panelists are selected to represent the entire market. The example seed panel generator 122 assigns geography and income data to the persons and/or homes corresponding to the audience assigned return path data and the meter data 102. The example seed panel generator 122 initiates the seed panel by selecting monitored panelists to be representative of the viewer/geography/income assigned return path data audience. For example, a monitored panelist may be selected based on a similarity between (A) the location of the monitored panelist and the location of a return path data audience member, (B) demographics corresponding to the location of the return path data audience member and the demographics of the monitored panelist, (C) media viewing characteristics of the return path data audience and the monitored panelist, etc.

The example station data storage 124 stores data related to station receivability by county. The example seed panel generator 122 uses the station data to calculate the station receivability for over the air homes, as further described in conjunction with FIG. 5. In some examples, the seed panel generator 122 filters the gathered seed panelists to collect attributes of interest at the person level and/or the household level. Attributes of interest at the person level may include age, gender, ethnicity, nationality, race, etc. and attributes at the household level may include head of household data, cable data, single set data, ADS data, county data, metro data, income, zip code, number of televisions, pay service data, etc. The example seed panel generator 122 weights the seed panelists according to the universe estimate(s) of the designated market area. The universe estimate is an estimate of the total number of users in a universe of users (e.g., total number of television viewers). In some examples, the universe estimate is broken down at the demographic level. In some examples, when out-of-tab seed panelists exist, the example seed panel generator 122 donates viewing based on a donor pool of seed panelists and/or monitored panelists of similar demographics. A seed panelist is out-of-tab when, for example, the panelist's LPM 112 is off, broken, and/or otherwise faulty. The viewing donation is further described below in conjunction with FIG. 6. Additionally, the example seed panel generator 122 may replicate and/or down-sample seed panelists according to a replication parameter to increase and/or decrease the degrees of freedom of the final seed panel. The example seed panel generator 122 replicates seed panelists by splitting seed panelists into two or more seed panelists whose weight is distributed among the two representative seed panelists. The example seed panel generator 122 down-samples the seed panelists by combining demographically similar seed panelists by combining the weight of the two or more seed panelists. The example seed panel generator 122 stores the final seed panel in the example seed panel storage 126.

The example seed panel optimizer 128 of FIG. 1 adjusts the seed panel generated by the example seed panel generator 122 to satisfy target ratings and/or target household ratings based on constraints. Such constraints may include audience constraints, including quarter hour constraints, daypart constraints, daily constraints, weekly constraints, monthly constraints, etc. Such constraints may also include reach constraints, including daypart reach constraints, daily reach constraints, weekly reach constraints, monthly reach constraints, etc. In some examples, the seed panel optimizer 128 applies a discrete optimization greedy search to adjust the panels to satisfy the target ratings and/or target household ratings based on the constraints. Additionally, the example seed panel optimizer 128 may add tuning without viewing data to households of the example seed panel. Tuning without viewing occurs when the example media presentation device 106 is on and the example media output device 108 is off, thereby affecting the accuracy of the example return path data 100 (e.g., the example return path data 100 identifies a program as being watched even though the example media output device 108 is off). The example seed panel optimizer 128 adjust the seed panel to account for tuning without viewing.

The example output file 130 of FIG. 1 includes the adjusted seed panel based on the target ratings, target household ratings, and other constraints. The example output file 130 may additionally include any other data related to the seed panel. In some examples, the output file 130 includes synthetic respondent level data (e.g., detailed demographic data of the adjusted seed panel), synthetic respondent level attributes, quarter hour ratings calculated from the synthetic respondent level data, daypart ratings calculated from the synthetic respondent level data, daypart reach calculated from the synthetic respondent level data, etc. Such data may be used to generate a report and/or may be further processed by a device (e.g., to estimate data related to the universe of users).

Figure 2:
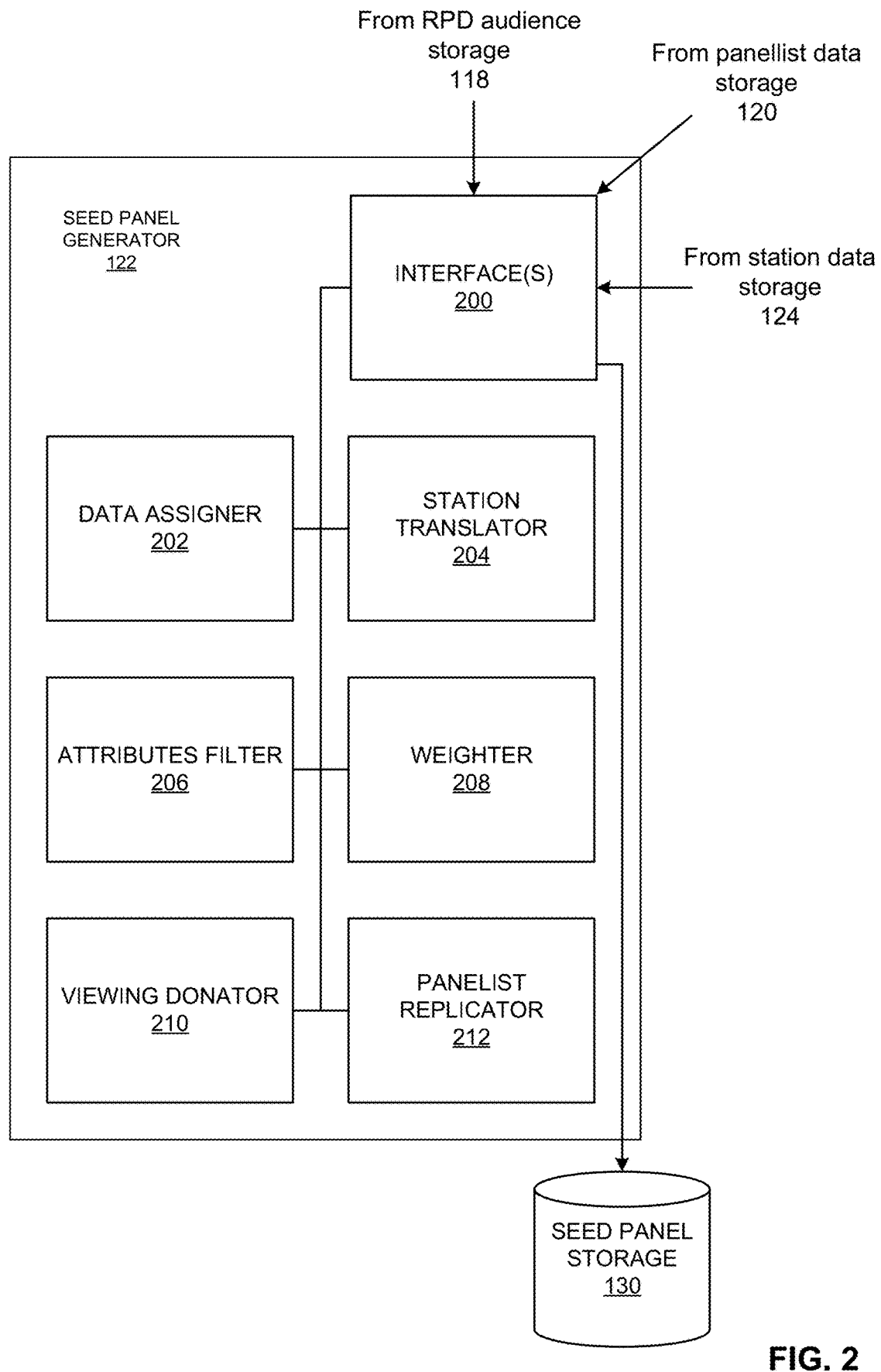
FIG. 2 is a block diagram of an example implementation of an example seed panel generator of FIG. 1.

FIG. 2 is a block diagram of an example implementation of the example seed panel generator 122 of FIG. 1 to generate a seed panel and output the seed panel to the example seed panel storage 126. The example seed panel generator 122 includes an example interface(s) 200, an example data assigner 202, an example station translator 204, an example attributes filter 206, an example weighter 208, an example viewing donator 210, and an example seed panelist replicator 212.

The example interface(s) 200 of FIG. 2 receives audience assigned return path data from the example return path data audience storage 118, meter data from the example panelist data storage 120, and/or station data from the example station data storage 124. Additionally, the example interface(s) 200 outputs the generated seed panel to the example seed panel storage 126. The example interface(s) 200 may be one interface capable of receiving and transmitting data to the example storages 118, 120, 124, 126 or may be multiple interfaces to interface with each, and/or any combination of, the example storages 118, 120, 124, 126. In some examples, the interface(s) 200 receive penalty coefficients from a user. The penalty coefficients are used to upweight and/or downweight the effect of certain constraints on each panelist's final penalty score. In this manner, a user can decide whether it is more important to converge on household targets as appose to demographic targets by setting the penalty coefficients.

The example data assigner 202 of FIG. 2 assigns geography data (e.g., county data) and income data to the audience assigned return path data audience and the monitored panelists corresponding to the example meter data 102. The example data assigner 202 uses designated marked area definitions by county, universe estimates for each county (e.g., number of homes, demographic composition of the homes, etc.), and/or demographics of seed panel homes to assign the geography data. Additionally or alternatively, the example data assigner 202 may assign geography data based on any grouping of land (e.g., city, state, etc.) The example data assigner 202 determines the geography data that will be assigned to the monitored panelists and the example audience assigned return path data audience by reducing error assigned to seed panel homes to counties in the designated market area based on probabilities of belonging to each country. In some examples, the data assigner 202 determines the geography data based on constraints, such as county capacity. The example data assigner 202 calculates the probability of a monitored panelist home belonging to a particular county based on comparison of seed panel demographics, demographics of the counties, universe estimates of the counties, and/or custom tabulations. To assign geography to an audience assigned return path data monitored panelist, the example data assigner 202 may generate the seed panel homes as supply nodes (e.g., representing items we want to assign or allocate), generate the counties as demand nodes (e.g., representing items we want supplies allocated to), and generate permissible assignments between the supply and demand nodes. The example data assigner 202 determines each cost for the permissible assignments and selects the geography assignment corresponding with the lowest cost. The example data assigner 202 of FIG. 2 assigns the income data based on the assigned county, postal codes, population distribution, income data, universe estimates, custom demographic data. In some examples, the data assigner 202 processes various data to assign income using a linear interpolation, full kernel estimate cumulative density function, and/or any other mathematical modelling. In some examples, the example data assigner 202 initiates the seed panel by selecting monitored panelists to represent the return path data audience based on a regional proximity to a designated market area, a similarity between demographics of the monitored panelist and demographics of the return path data audience location, household media characteristics (e.g., how the households receive television signals (cable, satellite, over-the-air radio, etc.)), a similarity between media consumption of the monitored panelists and the return path data audience, etc.

The example station translator 204 of FIG. 2 determines a station receivability list for the list of stations that are viewable by a particular audience member. The example return path data 100 may include the station receivability list and/or data corresponding to a station receivability list. However, meter data 102 may not include station receivability lists. To determine a station receivability list for the example media output device 110 of FIG. 1 (e.g., corresponding to over the air media), the example station translator 204 receives station data from the example station data storage 124 via the example interface(s) 200. The station data includes a list of viewable stations within a county. In some examples, the example station translator 204 translates viewing from the meter data 102 into a receivable station based on the station data. The translation of viewing into a receivable station is further described below in conjunction with FIG. 5.

The example attributes filter 206 of FIG. 2 filters the selected seed panelists to carry over certain attributes (e.g., person and/or household attributes) without any additional modeling. As described above, such attributes at the person level may include age, gender, ethnicity, nationality, race, etc. and such attributes at the household level may include head of household data, cable data, single set data, ADS data, county data, metro data, income, zip code, number of televisions, pay service data, etc.

The example weighter 208 of FIG. 2 weights the seed panelists according to the universe estimates. The seed panel may not accurately represent the total universe. Accordingly, the example weighter 208 weights the seed panelists so that the seed panel better represents the universe estimates. In this manner, the seed panelists are a statistically valid representation of the total universe of users.

The example viewing donator 210 of FIG. 2 donates viewing for out-of-tab seed panelists. A seed panelist is out-of-tab when, for example, the panelist's LPM 112 is off, broken, and/or otherwise faulty. Additionally, a seed panelist may be out-of-tab when the example return path data 100 is faulty or not being transmitted to the example AME 114. In such examples, the seed panelist may be watching the example media output device 108, 110, but not being credited for the viewing. Accordingly, the example viewing donator 210 determines when a seed panelist is out-of-tab and donates viewing data to represent the seed panelist until the seed panelist is back in-tab. Each seed panelist may have a corresponding donor pool of seed panelists and/or monitored panelists with similar demographics. When the example viewing donator 210 determines that the seed panelist is out-of-tab, the example viewing donator 210 selects a donor from the donor pool and uses the viewing data of the donor to represent the out-of-tab panelist. An example of donating viewing is further described below in conjunction with FIG. 6.

The example seed panelist replicator 212 of FIG. 2 replicates and/or down-samples the seed panel prior to storing in the example seed panel storage 126. The example seed panelist replicator 212 replicates and/or down-samples to increase or decrease the degrees of freedom of the seed panel. In this manner, the seed panel can be more easily adjusted to satisfy target ratings and/or household target ratings. The example seed panelist replicator 212 replicates a seed panelist by splitting the seed panelist into two or more seed panelists of equal weight. For example, if a first seed panelist has a weight of 10, the example seed panelist replicator 212 may split the seed panelist into two seed panelists of weight 5. In this manner, the seed panel still represent the total universe, but presents a more granular data set that can be easily adjusted to satisfy various constraints. Additionally, demographically similar seed panelists may be combined to down-sample the seed panel.

Figure 3:
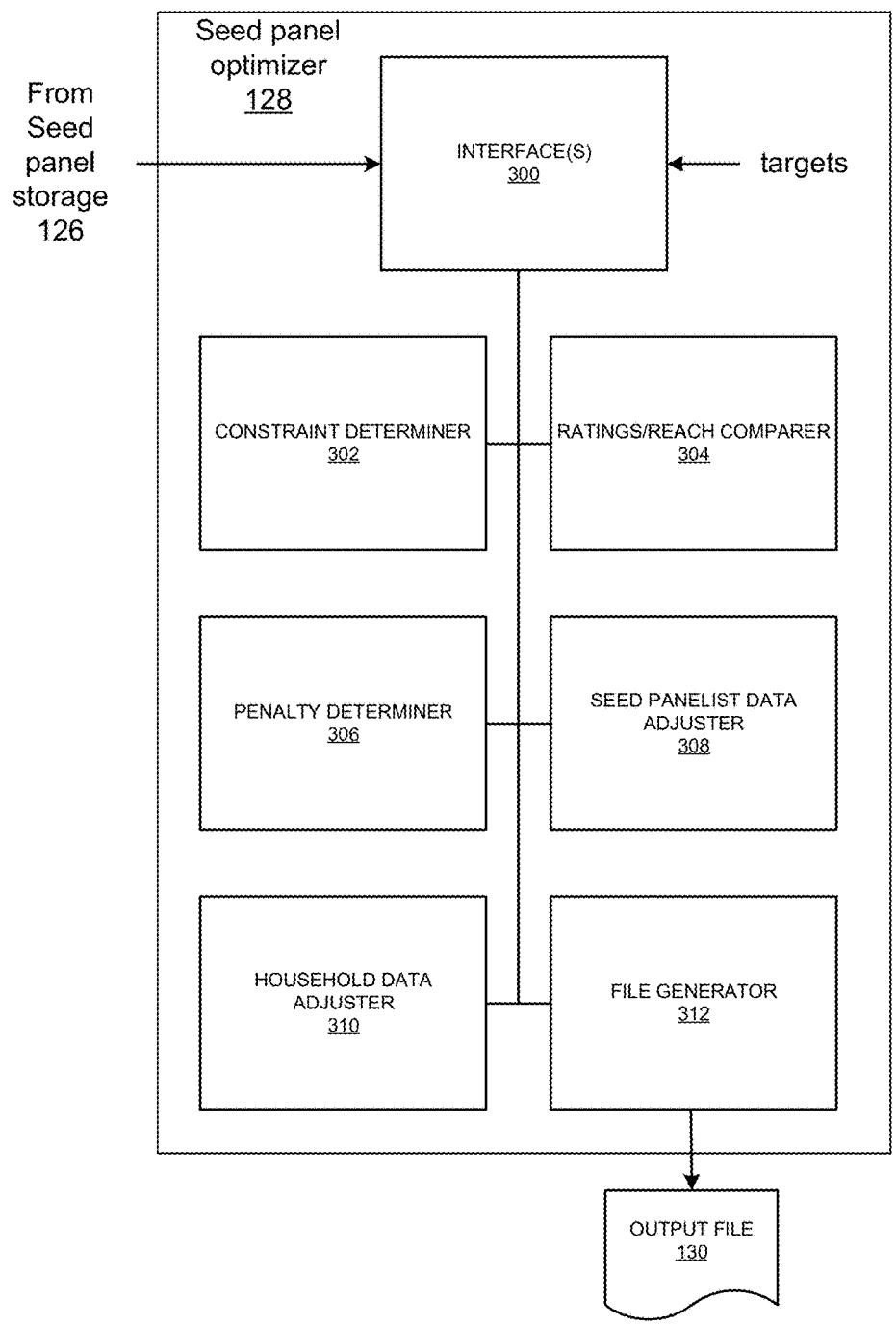
FIG. 3 is a block diagram of an example implementation of an example seed panel optimizer of FIG. 1.

FIG. 3 is block diagram of an example implementation of the example seed panel optimizer 128 of FIG. 1 to generate the example output file 130 based on adjusting the seed panel to satisfy target ratings and/or household ratings. The example seed panel optimizer 128 includes an example interface(s) 300, an example constraint determiner 302, an example ratings/reach comparer 304, an example penalty determiner 306, an example seed panelist data adjuster 308, an example household data adjuster 310, and the example file generator 312.

The example interface(s) 300 of FIG. 3 receive the seed panel from the example seed panel storage 126 and receive targets. The targets are target audience numbers (e.g., total count or percentage), household numbers, and/or reach numbers to be satisfied by the synthetic respondent level data. For example, a ratings target may include a percentage of a demographic group that viewed a program, channel, etc. within a quarter hour, day-part, day, etc. The targets may be based on known data from the universe, surveys, modeling, and/or other data sources. Because the seed panel may not correspond to the targets, the example seed panel optimizer 128 adjusts the panel to satisfy the targets, thereby outputting the example output file 130 corresponding to synthetic level respondent level data of the adjusted seed panel.

The example constraint determiner 302 of FIG. 3 determines the constraints for adjusting the seed panelists. For example, some seed panelists may not be adjusted. The example constraint determiner determines 302 which seed panelists can and which seed panelists cannot be adjusted and the parameters corresponding to the adjustment (e.g., how much can a seed panelist be adjusted). The example constraint determiner 302 further determines audience constraints corresponding to the seed panel. In some examples, the constraint determiner 302 receives audience constraints form a regionally calibrated quarter hour ratings file. In such examples, to generate quarter hour rating constraints, the example constraint determiner 302 takes percent rating directly from the file and converts to total quarter hours by multiplying the corresponding Universe Estimate. To generate daypart ratings constraints, the example constraint determiner 302 sums total quarter hours across the appropriate time window and aggregates up to different periods (e.g., daily, weekly, monthly, etc.). In some examples the constraint determiner 302 sums the total quarter hours viewed by all stations in a station mapping file to ensure a reasonable number of seed panelists and households are tuning at any given time. Additionally, the example constraint determiner 302 determines if consistency exists between the household audience constraints and the audience constraints for each demographic by calculating a maximum ratio. The maximum ratio is the sum of a person's weights for a given demographic divided by the sum of weights corresponding to households containing a member of the demographic. If the ratio of the person's viewership constraint for the demographic to the person's household viewership constraint exceeds the maximum ratio in any demographic by any quarter hour and/or station, the example constraint determiner 302 sets the person's viewership constraint to the household viewership constraint multiplied by the maximum ratio of the demographic.

Additionally, the example constraint determiner 302 of FIG. 3 determines reach constraints from the seed panel data. The example constraint determiner 302 calculates the reach constraints at the day part level. In a manner similar to the audience constraints, the example constraint determiner 302 calculates reach across periods (e.g., daily, weekly, monthly) using the reach daypart constraint. Additionally, the example constraint determiner 302 may calculate reach across all stations of a station mapping file to ensure a reasonable number of unique seed panelists and households that are tuning at any given time.

The example ratings/reach comparer 304 of FIG. 3 compares the target ratings to the seed panel ratings, the target household ratings to the seed panel household rating, the target reach to the seed panel reach, and/or the target household reach to the seed panel household reach. Additionally, the example ratings/reach comparer 304 determines if the comparisons satisfy one or more thresholds (e.g., viewing threshold(s), error threshold(s), etc.).

The example penalty determiner 306 of FIG. 3 determines penalties corresponding to a seed panelist and/or a seed panelist household. The penalty score of a seed panelist and/or household is a weighted sum that quantifies the relative error observed if the viewing of the seed panelist and/or household is modified. The formula(s) for calculating penalty (e.g., persons rating penalty, household rating penalty, persons reach penalty, and/or household reach penalty) is based on the viewership error (e.g., current rating−target rating) and is shown below in Table 1.

TABLE 1

Penalty Formulas

| NAME | FORMULA |
| --- | --- |
| Person-level Ratings<br>1. Quarter Hour<br>2. Daypart<br>   1. All-station | If cell needs to be increased:<br>  error = target − current<br>If cell needs to be decreased:<br>  error = current − target<br>If error == 0:<br>  penalty = 1 − 1/pwgt<br>If error <> 0:<br>  penalty = abs(1 − pwgt/error)<br>Where:<br>  target is the target rating<br>  current is the current rating<br>  observed in synthetic panel<br>  pwgt is the person weight of the<br>  given panelist. |
| Household-level Ratings<br>1. Quarter Hour<br>2. Daypart<br>3. All station<br>Household-level Reach<br>1. Daypart | If cell needs to be increased:<br>  error = target − current<br>  hct = hct + 1<br>If cell needs to be decreased:<br>  error = current − target<br>  hct = hct<br>If error == 0:<br>  score = (1 − 1/hwgt) + 1/hct<br>If error > 0:<br>  score = (1 − hwgt/error) + (1 − 1/hct)<br>If error < 0:<br>  score = (1 − hwgt/error) + 1/hct<br>If score > 2:<br>  penalty = 1<br>Else:<br>  penalty = score/2<br>Where:<br>  target is the target household<br>  ratings<br>  current is the current household<br>  rating observed in synthetic panel<br>  hwgt is the household weight of<br>  the given panelist's assigned<br>  household<br>  hct is the total number of times<br>  anyone in this panelist's<br>  household viewed this station(s)<br>  during this time period |

TABLE 1-continued

Penalty Formulas

| NAME | FORMULA |
|---|---|
| Person-level Reach Daypart | If cell needs to be increased:<br>  error = target − current<br>  pct = pct + 1<br>If cell needs to be decreased:<br>  error = current − target<br>  pct = pct<br>If error == 0:<br>  score = (1 − 1/pwgt) + 1/pct<br>If error > 0:<br>  score = (1 − pwgt/error) + (1 − 1/pct)<br>If error < 0:<br>  score = (1 − pwgt/error) + 1/pct<br>If score > 2:<br>  penalty = 1<br>Else:<br>  penalty = score/2<br>Where:<br>  target is the target person reach<br>  current is the current person reach observed in synthetic panel<br>  pwgt is the person weight of the given panelist<br>  pct is the total number of times this panelist viewed this station(s) during this time period |
| Person-level Repertoire - corresponding to the likelihood that the panelist would be exposed to this type of programing<br>  1. Genre<br>  2. Station | If cell needs to be increased:<br>  penalty = 1 − view_pct<br>If cell needs to be decreased:<br>  penalty = view_pct<br>Where:<br>  view_pct is the proportion of the given panelist's tuning that is spent watching a given genre or station |
| Person-level Activity - corresponding to the likelihood that the panelist would be exposed to media at this time of day<br>  1. Quarter Hour*<br>  2. Daypart | If cell needs to be increased:<br>  penalty = 1 − view_pct<br>If cell needs to decreased:<br>  penalty = view_pct<br>Where:<br>  view_pct is the proportion of the reporting period that a panelist is watching any station during a given quarter hour* or daypart<br>*Note that to properly capture the differences between panelist behavior on weekdays vs weekends, the proportion spent viewing a given quarter hour is broken out by day of week. A panelist might view the $92^{nd}$ quarter hour 10% of the time on Mondays but 80% of the time on Saturdays. |

The example penalty determiner 306 of FIG. 3 determines the final penalty corresponding to a person (e.g., seed panelist) and/or household (e.g., seed panelist household) based on a weighted sum of the penalties. In some examples, the penalty determiner 306 adjusts the weights based on adjustments made to the seed panelists.

The example seed panelist data adjuster 308 of FIG. 3 adjusts the seed panel to satisfy the various targets and/or constraints. The example seed panelist data adjuster 308 adjusts the seed panel by adding and/or subtracting quarter hours for a selected panelist (e.g., a seed panelist that may be adjusted). The example seed panelist data adjuster 308 adds/subtracts quarter hours by incrementing or decrementing the rating (e.g., the current seed panel rating) for the demographic of the seed panelists by the weight of the panelist. In this manner, the example seed panelist data adjuster 308 uses the new, updated ratings total in all subsequent calculations.

The example household data adjuster 310 of FIG. 3 adjusts seed panel households to satisfy the various targets and/or constraints. The example household data adjuster 310 adjusts a household by adding and/or subtracting quarter hours for a household (e.g., a household that may be adjusted). The household data adjuster 310 adds a quarter hour to a household by determining how many seed panelists in the household have viewing to the given station, program, etc. during the given quarter hour. If the count is zero, the example household data adjuster 310 increments the household rating by the household weight. If the count is greater than zero, the household data adjuster 310 does not change the household rating, but the household count is increased by one. The household data adjuster 310 subtracts a quarter hour to a household in a similar manner by decrementing the household rating and/or household count based on the count.

The example file generator 312 of FIG. 3 generates the example output file 130 based on the adjusted seed panel corresponding to the target rating(s) and/or reach(es). As described above, the example file generator 312 generates the example output file 130 to include synthetic respondent level data, synthetic respondent level attributes, quarter hour ratings calculated from the synthetic respondent level data, daypart ratings calculated from the synthetic respondent level data, daypart reach calculated from the synthetic respondent level data, etc. The example file generator 312 may output the example output file 130 to an additional device for further processing and/or to generate a report.

While an example manner of implementing the example seed panel generator 122 of FIG. 1 is illustrated in FIG. 2 and/or the example seed panel optimizer 128 of FIG. 1 is illustrated in FIG. 3, one or more elements, processes and/or devices illustrated in FIGS. 2 and/or 3 may be combined, divided, re-arranged, omitted, eliminated and/or implemented in any other way. Further, the example metering receiver 202, the example tuning session determiner 204, the example presentation session determiner 206, the example modeler 208, the example model storage 210, the example tuning data receiver 212, the example duration determiner 214, the example presentation session estimator 216, the example reporter 218, and/or, more generally, the example seed panel generator 122, of FIG. 2 and/or the example interface(s) 300, the example constraint determiner 302, the example rating/reach comparer 304, the example penalty determiner 306, the example seed panelist data adjuster 308, the example household data adjuster 310, the example file generator 312, and/or, more generally, the example seed panel optimizer 128 may be implemented by hardware, machine readable instructions, software, firmware and/or any combination of hardware, machine readable instructions, software and/or firmware. Thus, for example, any of the example metering receiver 202, the example tuning session determiner 204, the example presentation session determiner 206, the example modeler 208, the example model storage 210, the example tuning data receiver 212, the example duration determiner 214, the example presentation session estimator 216, the example reporter 218, and/or, more generally, the example the example seed panel generator 122, of FIG. 2 and/or the example interface(s) 300, the example constraint determiner 302, the example rating/reach comparer 304, the example penalty determiner 306, the example seed panelist data adjuster 308, the example household data adjuster 310, the example file generator 312, and/or, more generally, the example seed panel optimizer 128 could be implemented by one or more analog or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one the example metering receiver 202, the example tuning session determiner 204, the example presentation session determiner 206, the example modeler 208, the example model storage 210, the example tuning data receiver 212, the example duration determiner 214, the example presentation session estimator 216, the example reporter 218, and/or, more generally, the example the example seed panel generator 122, of FIG. 2 and/or the example interface(s) 300, the example constraint determiner 302, the example rating/reach comparer 304, the example penalty determiner 306, the example seed panelist data adjuster 308, the example household data adjuster 310, the example file generator 312, and/or, more generally, the example seed panel optimizer 128 is/are hereby expressly defined to include a tangible computer readable storage device or storage disk such as a memory, a digital versatile disk (DVD), a compact disk (CD), a Blu-ray disk, etc. storing the software and/or firmware. Further still, the example seed panel generator 122 of FIG. 2 and/or the example seed panel optimizer 128 of FIG. 3 may include one or more elements, processes and/or devices in addition to, or instead of, those illustrated in FIGS. 2 and 3, and/or may include more than one of any or all of the illustrated elements, processes and devices.

Figure 4:
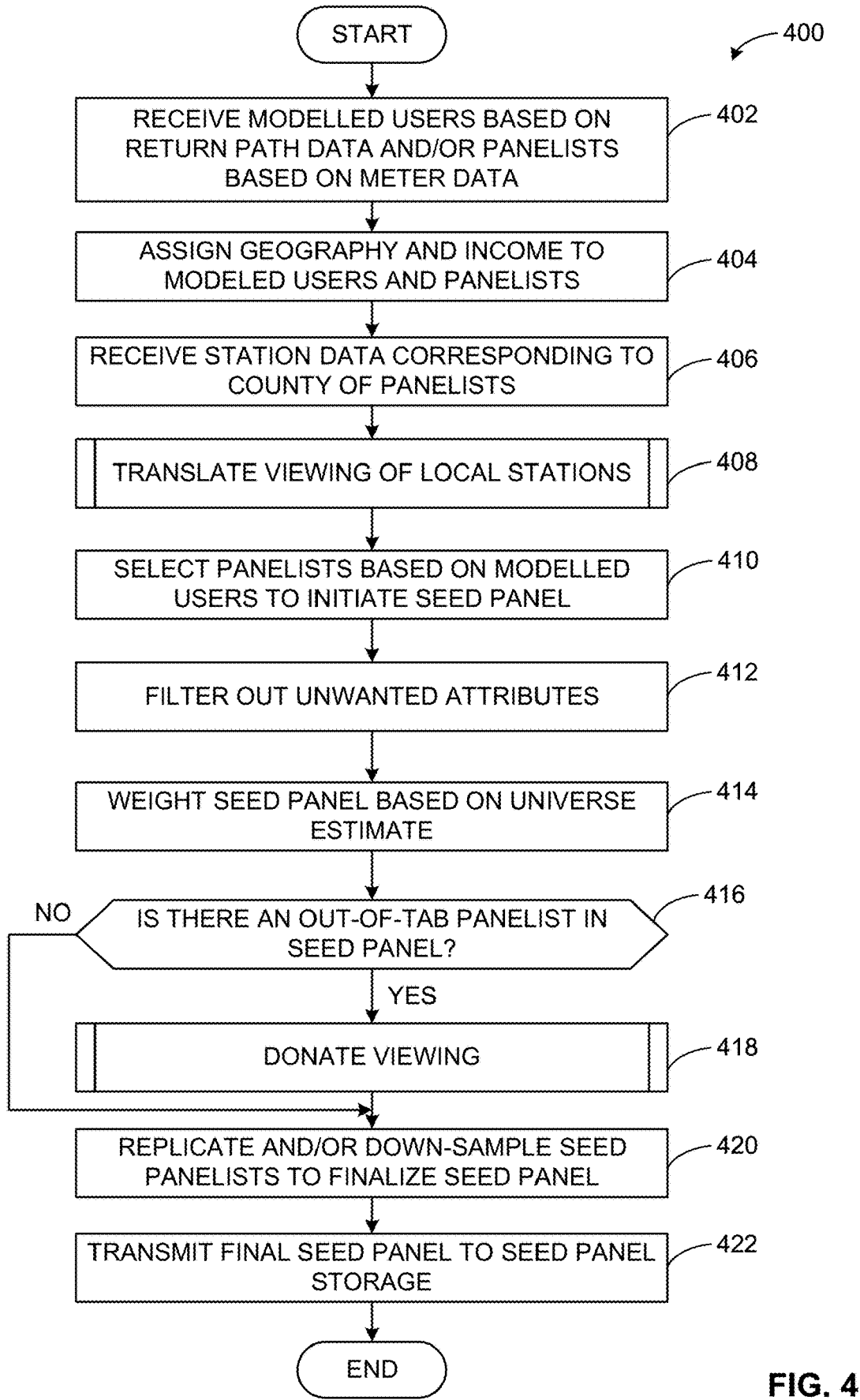
FIGS. 4-6 are flowcharts illustrating example machine readable instructions that may be executed to implement the example seed panel generator of FIGS. 1 and/or 2.
Figure 5:
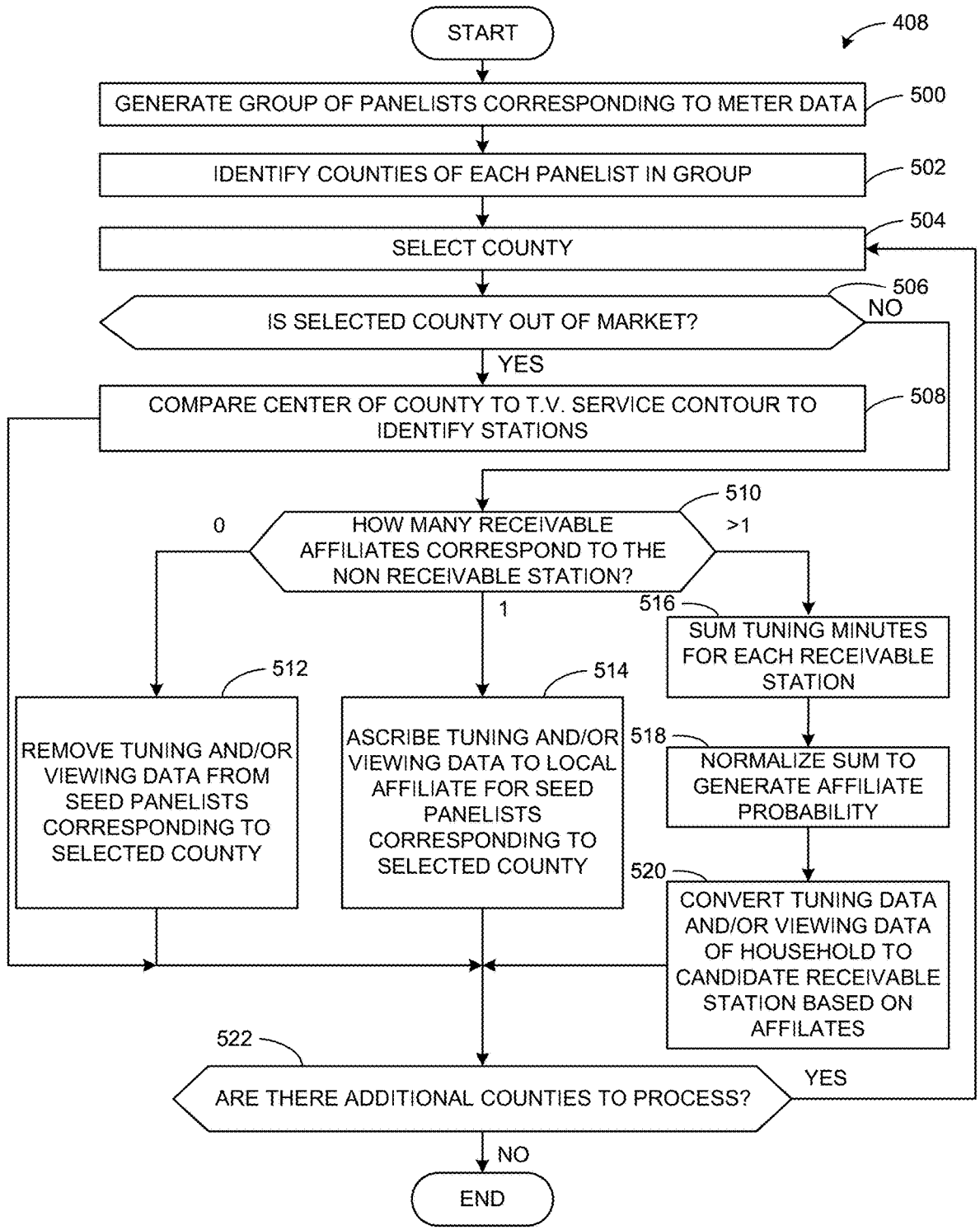
Figure 6:
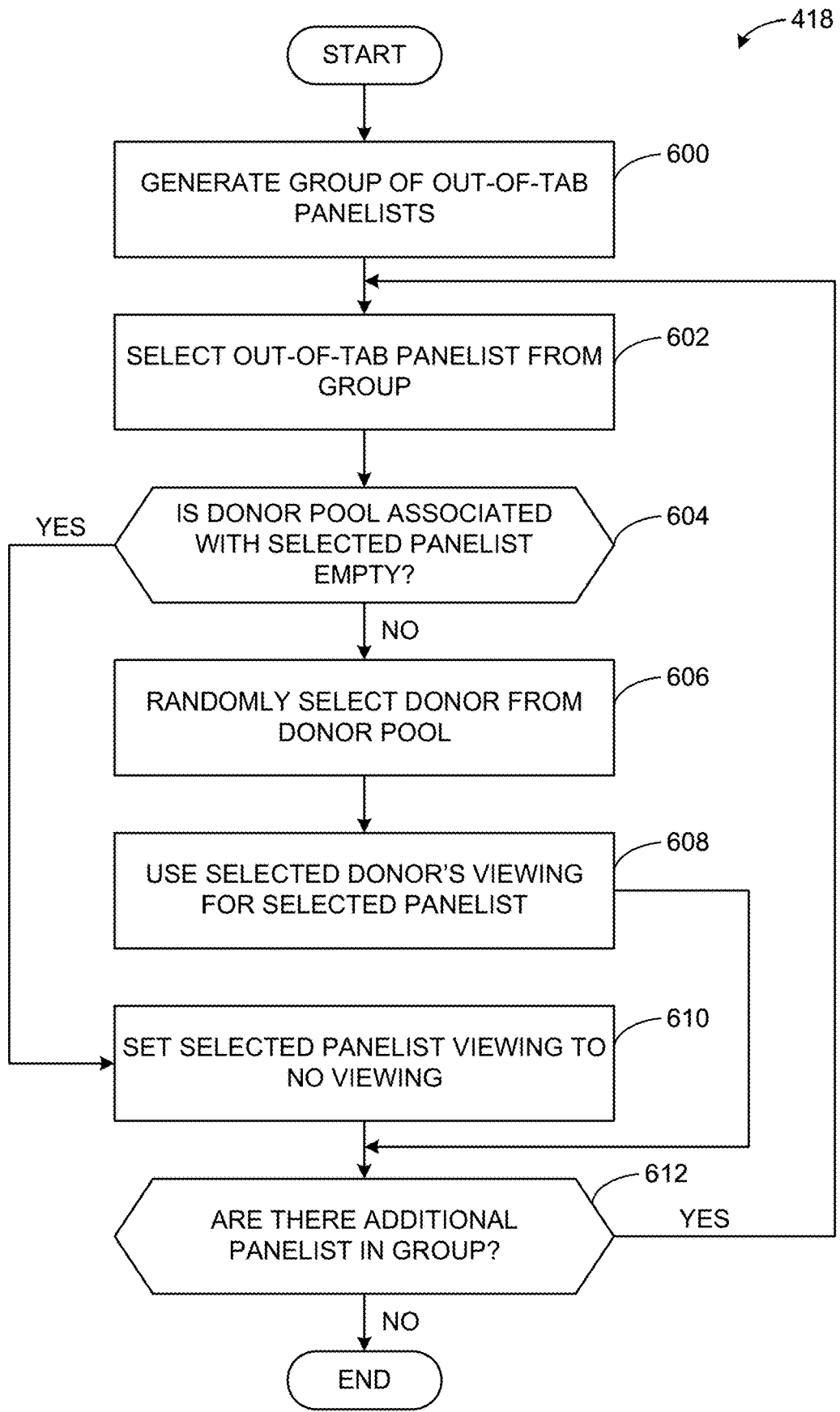

Flowcharts representative of example machine readable instructions for implementing the example seed panel generator 122 of FIG. 2 are shown in FIGS. 4-6 and example machine readable instructions for implementing the example seed panel optimizer 128 of FIG. 3 are shown in FIG. 7-11. In the examples, the machine readable instructions comprise a program for execution by a processor such as the processor 1212, 1312 shown in the example processor platform 1200, 1300 discussed below in connection with FIGS. 12 and/or 13. The program may be embodied in software stored on a tangible computer readable storage medium such as a CD-ROM, a floppy disk, a hard drive, a digital versatile disk (DVD), a Blu-ray disk, or a memory associated with the processor 1212, 1312 but the entire program and/or parts thereof could alternatively be executed by a device other than the processor 1212, 1312 and/or embodied in firmware or dedicated hardware. Further, although the example program is described with reference to the flowcharts illustrated in FIGS. 4-11, many other methods of implementing the example seed panel generator 122 of FIG. 2 and/or the example seed panel optimizer 128 of FIG. 3 may alternatively be used. For example, the order of execution of the blocks may be changed, and/or some of the blocks described may be changed, eliminated, or combined.

As mentioned above, the example processes of FIGS. 4-11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any period (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any period (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 4 is an example flowchart 400 representative of example machine readable instructions that may be executed by the example seed panel generator 122 of FIGS. 1 and 2 to generate a seed panel. Although the instructions of FIG. 4 are described in conjunction with the example seed panel generator 122 of FIGS. 1 and 2, the example instructions may be utilized by any type of seed panel generator.

At block 402, the example interface(s) 200 receive modelled users (e.g., corresponding to the audience assigned return path data) and/or monitored panelists (e.g., users corresponding to the example meter data 102). At block 404, the example data assigner 202 assigns geography and income to the modeled return path data users and the monitored panelists. As described above in conjunction with FIG. 2, the example data assigner 202 assigns geography and income based on designated marked area definitions by county, universe estimates for each county (e.g., number of homes, demographic composition of the homes, etc.), and/or demographics of seed panel homes to assign the geography data.

At block 406, the example station translator 204 receives station data corresponding to counties of the monitored panelists' locations from the example station data storage 124. At block 408, the example station translator 204 translates viewing of local stations. The example station translator 204 translates the viewing based on a receivability list for the counties corresponding to the monitored panelists, as described below in conjunction with FIG. 5. At block 410, the example data assigner 202 selects monitored panelists from the example panelist storage 120 to represent the data assigned modelled users (e.g., return path data audience) to initiate the seed panel. At block 412, the example attributes filter 206 filters out unwanted attributes, leaving the desired attributes remaining. As described above in conjunction with FIG. 2, such desired attributes may be at the person level and/or the household level, including, but not limited to, age, gender, ethnicity, nationality, race, head of household data, cable data, single set data, ADS data, county data, metro data, income, zip code, number of televisions, pay service data, etc.

At block 414, the example weighter 208 weights the seed panel based on a universe estimate. The universe estimate is an estimate of the total number of users in a universe of users. In some examples, the universe estimate is broken down at the demographic level. At block 416, the example viewing donator 210 determines if there is an out-of-tab seed panelist in the seed panel. As described above, a seed panelist is out-of-tab when the example return path data 100 and/or the example meter data 102 is faulty (e.g., includes an error) and/or is not being transmitted to the example AME 114. If the example viewing donator 210 determines that there is an out-of-tab seed panelist in the seed panel (block 416: YES), the example viewing donator 210 donates viewing to the out-of-tab seed panelist. The process for donating viewing is further described in conjunction with FIG. 6. At block 420, the example seed panelist replicator 212 replicates and/or down-samples seed panelists to one or more of the seed panelists to finalize the seed panel. As described above in conjunction with FIG. 2, the example seed panelist replicator 212 replicates and/or down-samples seed panelist to increase and/or decrease the degrees of freedom of the example seed panel. At block 422, the example interface(s) 200 transmits the final seed panel to the example seed panel storage 126.

FIG. 5 is an example flowchart 408 representative of example machine readable instructions that may be executed to implement the example seed panel generator 122 of FIGS. 1 and 2 to translate viewing of local stations, as described above in conjunction with block 408 of FIG. 4. Although the instructions of FIG. 5 are described in conjunction with the example seed panel generator 122 of FIGS. 1 and 2, the example instructions may be utilized by any type of seed panel generator.

At block 500, the example station translator 204 generates a group of seed panelists corresponding to the example meter data 102. At block 502, the example station translator 204 identifies counties of each seed panelist in the group. The counties are identified based on location data corresponding to the seed panelists stored in the example panelist data storage 120 and/or any other storage or database. At block 504, the example station translator 204 selects a county from the identified counties.

At block 506, the example station translator 204 determines if the selected county is out-of-market. The example station translator 204 may determine that the selected county is out-of-market when the meter data 102 of seed panelists in the selected county corresponds to stations which are not included in the seed panelists station receivability. If the example station translator 204 determines that the selected county is out-of-market (block 506: YES), the example station translator 204 compares the center of the selected county to a television service contour (e.g., stored in the example station data database 124 of FIG. 1) to identify stations corresponding to the selected county (block 508). In some examples, the station translator 204 determines the center of the selected county to be the location representative of the center of the population of the county. All stations corresponding to the county point are considered receivable for over the air only homes within the county.

If the example station translator 204 determines that the selected county is out-of-market (block 506: NO), the example station translator 204 determines the number of non-receivable affiliates(s) that correspond to the non-receivable station (block 510). If the example station translator 204 determines that there are not any receivable affiliates corresponding to the non-receivable station (block 510: 0), the example station translator 204 removes tuning and/or viewing data from the seed panelist(s) corresponding to the selected county (block 512). If the example station translator 204 determines that there is one receivable affiliate corresponding to the non-receivable station (block 510: 1), the example station translator 204 ascribes tuning and/or viewing data to the local affiliate for seed panelists corresponding to the selected country (block 514). If the example station translator 204 determines that there are more than one receivable affiliate corresponding to the non-receivable station (block 510: >1), the example station translator 204 sums the tuning minutes for each receivable station (block 516).

At block 518, the example station translator 204 normalizes the sum to generate an affiliate probability. At block 520, the example station translator 204 converts tuning and/or viewing data of the households in the selected county to a candidate receivability session based on the affiliates. The example station translator 204 selects the candidate receivability session based on the affiliate probability. At block 522, the example station translator 204 determines if there are additional counties to process. If the example station translator 204 determines that there are additional counties to process (block 522: YES), the example station translator 204 returns to block 504 to translate viewing for the additional counties. If the example station translator 204 determines that there are not additional counties to process (block 522: NO), the process ends.

FIG. 6 is an example flowchart 418 representative of example machine readable instructions that may be executed to implement the example seed panel generator 122 of FIGS. 1 and 2 to donate viewing, as described above in conjunction with block 418 of FIG. 4. Although the instructions of FIG. 6 are described in conjunction with the example seed panel generator 122 of FIGS. 1 and 2, the example instructions may be utilized by any type of seed panel generator.

At block 600, the example viewing donator 210 generates a group of out-of-tab seed panelists of the seed panel. At block 602, the example viewing donator 210 selects a first out-of-tab seed panelist from the generated group. At block 604, the example viewing donator 210 determines if the donor pool associated with the selected out-of-tab seed panelist is empty. As described above in conjunction with FIG. 2, the donor pool is a pool of seed panelists and/or monitored panelists that have similar demographic data as the selected out-of-tab seed panelist. If the example viewing donator 210 determines that the donor pool associated with the selected panelist is not empty (block 604: NO), the example viewing donator 210 randomly selects a donor from the donor pool. Additionally or alternatively, the example viewing donator 210 may select a donor that most closely matches the demographics and/or viewing habits of the selected panelist. At block 608, the example viewing donator 210 uses the selected donor's viewing for the selected panelist. In this manner, the lack of viewing data from the out-of-tab seed panelist may be supplemented to increase the accuracy of the seed panel.

If the example viewing donator 210 determines that the donor pool associated with the selected panelist is empty (block 606: YES), the example viewing donator 210 sets the selected panelist viewing to no viewing. At block 612, the example viewing donator 210 determines if there is an additional seed panelist in the out-of-tab seed panelist group. If the example viewing donator 210 determines that there is an additional seed panelist in the out-of-tab seed panelist group (block 612: YES), the example viewing donator 210 repeats this process for the additional out-of-tab seed panelist in the group.

Figure 7:
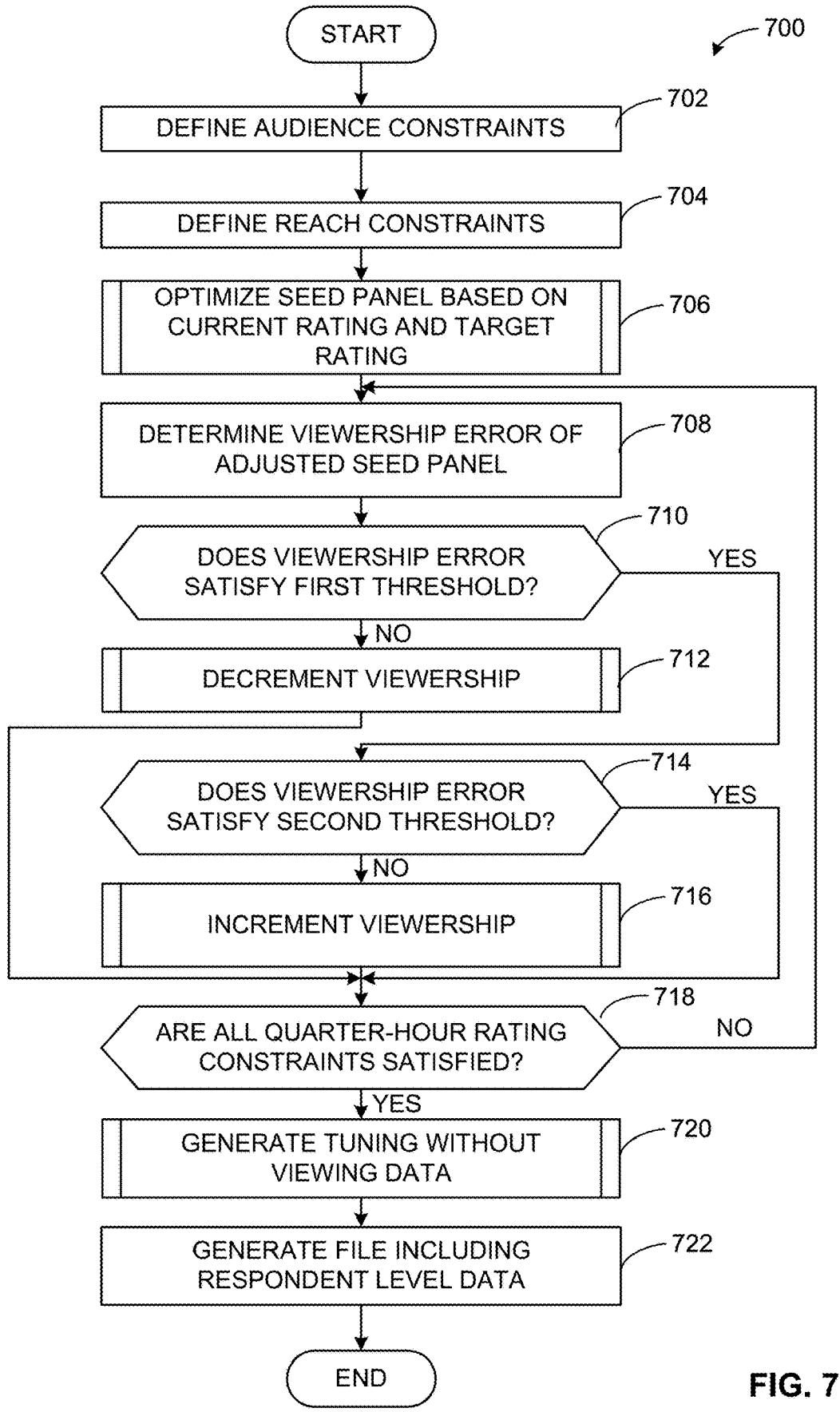
FIGS. 7-11 are flowcharts illustrating example machine readable instructions that may be executed to implement the example seed panel optimizer of FIGS. 1 and/or 3.

FIG. 7 is an example flowchart 700 representative of example machine readable instructions that may be executed by the example seed panel optimizer 128 of FIGS. 1 and 2 to adjust the seed panel based on target ratings/reach. Although the instructions of FIG. 7 are described in conjunction with the example seed panel optimizer 128 of FIGS. 1 and 2, the example instructions may be utilized by any type of seed panel optimizer.

At block 702, the example constraint determiner 302 defines the audience constraints. At block 704, the example constraint determiner defines the reach constraints. The audience constraint(s) and/or reach constraint(s) may be included in a quarter hour ratings file and may be expanded to a day part, a day, a week, a month, etc., as described above in conjunction with FIG. 3. At block 706, the example seed panel optimizer 128 optimizes the seed panel based on the current rating of the seed panel and a received target rating. For example, if the received target rating is 5% of African American users that watched a program at a first time and the current rating corresponds to 3% of African American users that watched the program at the first time, the seed panel optimizer 128 optimizes the seed panel to model the target rating more closely. The optimization process is further described in conjunction with FIG. 8.

At block 708, the example seed panelist data adjuster 308 determines viewership error of the adjusted seed panel. The example seed panelist data adjuster determines the viewership error based on a difference between the current viewership and the target viewership for a particular cell (e.g., a demographic and time corresponding to the target rating). At block 710, the example seed panelist data adjuster 308 determines if the viewership error satisfies a first threshold (e.g. a viewing threshold). For example, if the viewership error is greater than the first threshold (e.g., the viewership is overstated where the current viewership is higher than the target viewership), the seed panelist data adjuster 308 determines that the viewership error does not satisfy the first threshold. If the example seed panelist data adjuster 308 determines that the viewership error does not satisfy the first threshold (block 710: NO), the example seed panel optimizer 128 decrements the viewership until the first threshold is satisfied or the viewership can no longer be decremented (block 712), as described below in conjunction with FIG. 9.

If the example seed panelist data adjuster 308 determines that the viewership error does satisfy the first threshold (block 710: YES), the example seed panelist data adjuster 308 determines if the viewership error satisfies a second threshold (e.g. −1×(the viewing threshold)) (block 714). For example, if the viewership error is less than the second threshold (e.g., the viewership is understated where the current viewership is lower than the target viewership), the seed panelist data adjuster 308 determines that the viewership error does not satisfy the second threshold. If the example seed panelist data adjuster 308 determines that the viewership error does not satisfy the second threshold (block 714: NO), the example seed panel optimizer 128 increments the viewership until the first threshold is satisfied or the viewership can no longer be incremented (block 716), as described below in conjunction with FIG. 10.

At block 718, the example seed panelist data adjuster 308 determines if all quarter-hour rating constraints are satisfied. If all the quarter-hour rating constraints are not satisfied (block 718: NO), the process returns to block 708, and the viewership adjustment loop is repeated until all quarter hour ratings constraints are met. In some examples, the process is repeated until all quarter hour rating constraints are met within some tolerance level. If the example seed panelist data adjuster 308 determines that all quarter hour rating constraints have been satisfied (or have meet the tolerance level) (block 718: YES), the example household data adjuster generates tuning without viewing data (block 720), as further described in conjunction with FIG. 11. At block 722, the example file generator 312 generates the example output file 130 including synthetic respondent level data for the adjusted seed panel.

Figure 8:
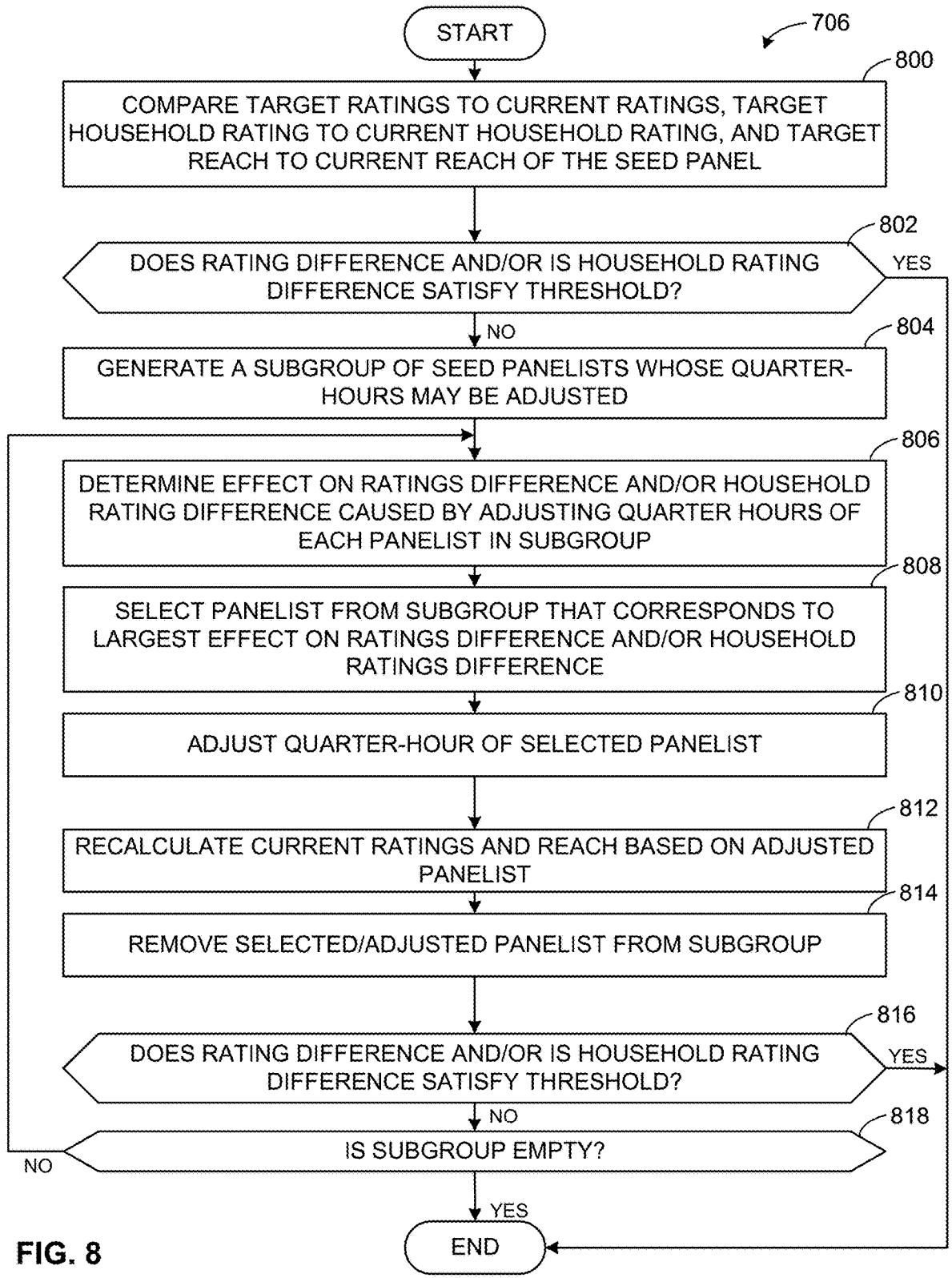

FIG. 8 is an example flowchart 706 representative of example machine readable instructions that may be executed to implement the example seed panel optimizer 128 of FIGS. 1 and 3 to optimize the seed panel based on the current rating and the target rating, as described above in conjunction with block 706 of FIG. 7. Although the instructions of FIG. 8 are described in conjunction with the example seed panel optimizer 128 of FIGS. 1 and 3, the example instructions may be utilized by any type of seed panel optimizer.

At block 800, the example ratings/reach comparer 304 compares the target ratings to the current ratings, the target household rating to the current household rating, and the target reach to the current reach of the seed panel. For example, the rating/reach comparer 304 compares the target ratings to the current ratings by calculating a difference between the target ratings and the current ratings (e.g., the rating difference). The example rating/reach comparer 304 may compare the target household rating to the current household rating, and the target reach to the current reach in a similar manner to determine a household rating difference and/or a reach difference.

At block 802, the example rating/reach comparer 304 determines if the rating difference (e.g., the difference between the target rating and the current rating) and/or the household rating (e.g., the difference between the target household rating and the current household rating) satisfies a threshold (e.g., a viewing threshold). In some examples, the ratings/reach comparer 304 analyzes the rating difference and the household rating difference. In some examples, the ratings/reach comparer 304 analyzes one of the rating difference or the household rating difference. If the example ratings/reach comparer 304 determines that the rating difference and/or the household rating difference satisfies the threshold (block 802: YES), the process ends. If the example ratings/reach comparer 304 determines that the rating difference and/or the household rating difference does not satisfy the threshold (block 802: NO), the example seed panelist data adjuster 308 generates a subgroup of seed panelists whose quarter hours may be adjusted (block 804). For example, to decrease quarter hours of a selected panelist of a given station and/or quarter hour, the selected panelist must have tuned into the station during the quarter hour. Additionally, to increase a quarter hour of a selected panelist of a given station and/or quarter hour, the selected panelist must (A) be capable of receiving the media, (B) have less than a maximum number of tuning events during any quarter hour associated with the media, and (C) the selected panelist's weight must be less than two times the rating balance for them to be included in the subgroup.

At block 806, the example seed panelist data adjuster 308 determines the effect on the rating difference and/or the household rating difference caused by adjusting the quarter hours of each seed panelist in the subgroup. In some examples, the seed panelist data adjuster 308 determines the effect of each seed panelist to identify which seed panelist adjustment (e.g. increase or decrease of quarter hour(s) for each seed panelist) will contribute the most and/or least to the ratings difference and/or the household ratings difference. At block 808, the example seed panelist data adjuster 308 selects the seed panelist from the subgroup that corresponds to the largest effect on the rating difference and/or household rating difference (e.g., the adjustment that, when applied, causes the current rating to be closer to the target rating and/or causes the current household rating to be closer to the target household rating).

At block 810, the example seed panelist data adjuster 308 adjusts the quarter hour(s) of the selected seed panelist. As described above in conjunction with FIG. 3, the example seed panelist data adjuster 308 adjusts the quarter hour(s) of the selected seed panelist by incrementing and/or decrementing the weight of the selected seed panelist in the current ratings for the seed panelist's demographic. At block 812, the example seed panelist data adjuster 308 recalculates the current ratings (e.g., person ratings and/or household ratings) and reach (e.g., person and/or household reach) based on the adjusted seed panelist. In this manner, subsequent adjustment and/or calculations will be based on the recalculated current ratings and/or reach. At block 814, the example seed panelist data adjuster 308 removes the selected/adjusted seed panelist from the subgroup.

At block 816, the example ratings/reach comparer 304 determines if the rating difference and/or the household rating difference satisfies the threshold. If the example ratings/reach comparer 304 determines that the rating difference and/or the household rating difference satisfies the threshold (block 816: YES), the process ends, the example ratings/reach comparer 304 determines that the rating difference and/or the household rating difference does not satisfy the threshold (block 816: NO), the example seed panelist data adjuster 308 determines if the subgroup of seed panelists is empty (e.g., each seed panelist's quarter hours were adjusted and each seed panelist was removed from the subgroup) (block 818). If the example seed panelist data adjuster 308 determines that the subgroup of seed panelists is not empty (block 818: NO), the process returns to block 806 to further adjust quarter hours of remaining seed panelists in the subgroup.

Figure 9:
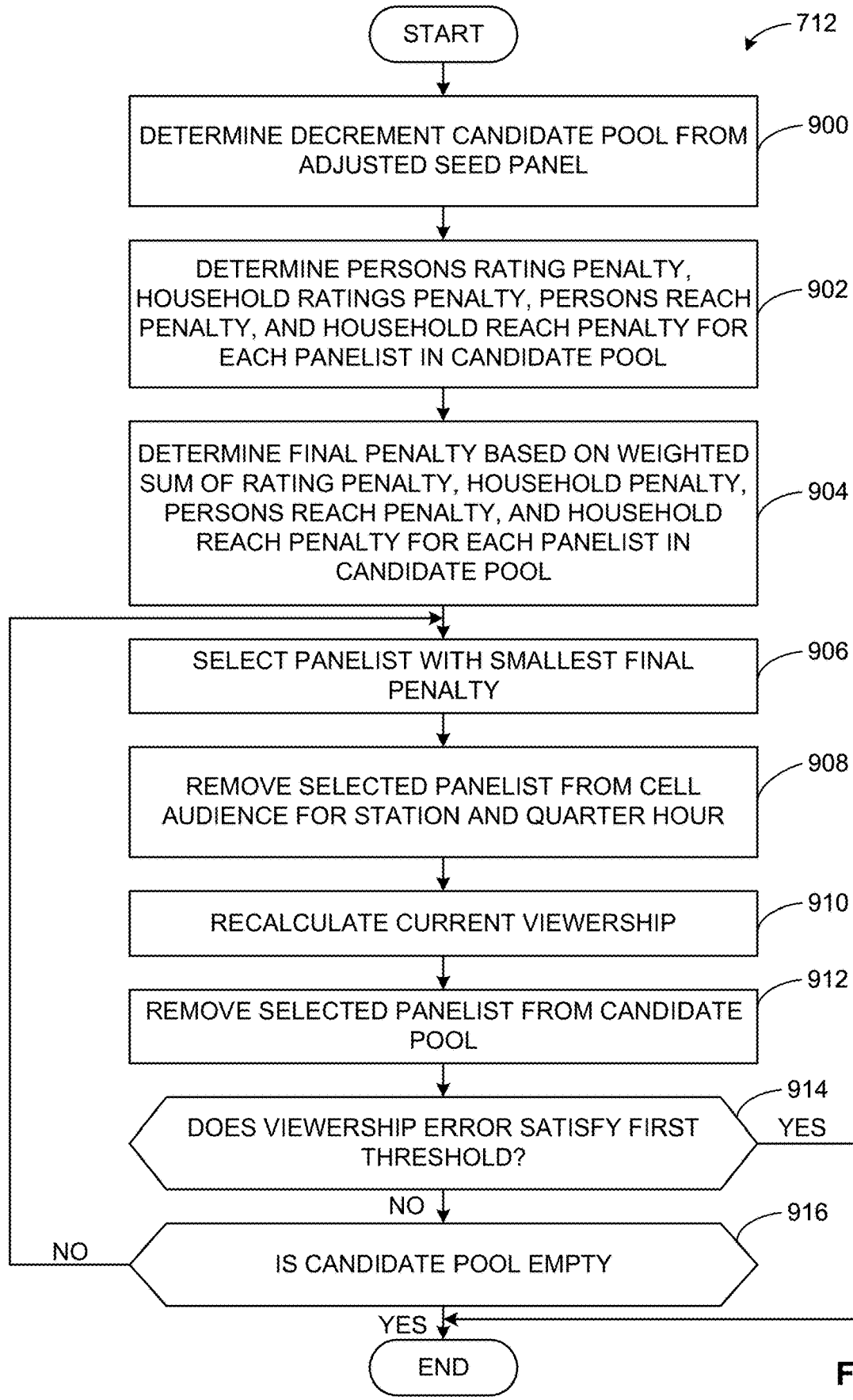

FIG. 9 is an example flowchart 712 representative of example machine readable instructions that may be executed to implement the example seed panel optimizer 128 of FIGS. 1 and 3 to decrement viewership, as described above in conjunction with block 712 of FIG. 7. Although the instructions of FIG. 9 are described in conjunction with the example seed panel optimizer 128 of FIGS. 1 and 3, the example instructions may be utilized by any type of seed panel optimizer.

At block 900, the example seed panelist data adjuster 308 determines a decrement candidate pool from the adjusted seed panel. In some examples, the seed panelist data adjuster 308 includes adjusted seed panelists in the decrement candidate pool when the adjusted seed panelists satisfy various conditions. Such conditions may include seed panelists corresponding to the demographic of the target rating and/or seed panelists corresponding to the audience of the station and quarter hour of the target rating.

At block 902, the example penalty determiner 306 determines the persons rating penalty, household ratings penalty, the persons reach penalty, and the household reach penalty for each seed panelist in the decrement candidate pool. The determination of each penalty is described above in conjunction with Table 1. At block 904, the example penalty determiner 306 determines the final penalty based on the weighted sum (e.g., weighted by a coefficient) of the rating penalty, the household penalty, the persons reach penalty, and the household reach penalty for each seed panelist in the decrement candidate pool. As described above in conjunction with block 812 of FIG. 8, the coefficient of an adjusted seed panelist may be adjusted, thereby affecting the weighted sum of the final penalty.

At block 906, the example seed panelist data adjuster 308 selects the panelist with the smallest final penalty. At block 908, the example seed panelist data adjuster 308 removes the selected seed panelist from the cell audience (e.g., the audience corresponding to the target rating) for station and quarter hour, thereby reducing the viewership error. At block 910, the example seed panelist data adjuster 308 recalculates the current viewership. At block 912, the example seed panelist data adjuster 308 removes the seed panelist from the decrement candidate pool. At block 914, the example ratings/reach comparer 304 determines, based on the recalculated current viewership, if the viewership error satisfies the first threshold (e.g., the viewing threshold).

If the example rating/reach comparer 304 determines that the viewership error satisfies the first threshold (block 914: YES), the process ends. If the example rating/reach comparer 304 determines that the viewership error does not satisfy the first threshold (block 914: NO), the example seed panelist data adjuster 308 determines if the decrement candidate pool is empty (block 916). If the example seed panelist data adjuster 308 determines that the decrement candidate pool is empty (block 916: YES), the process ends. If the example seed panelist data adjuster 308 determines that the decrement candidate pool is not empty (block 916: NO), the process returns to block 906 until the viewership error is sufficiently reduced or the decrement candidate pool is empty.

Figure 10:
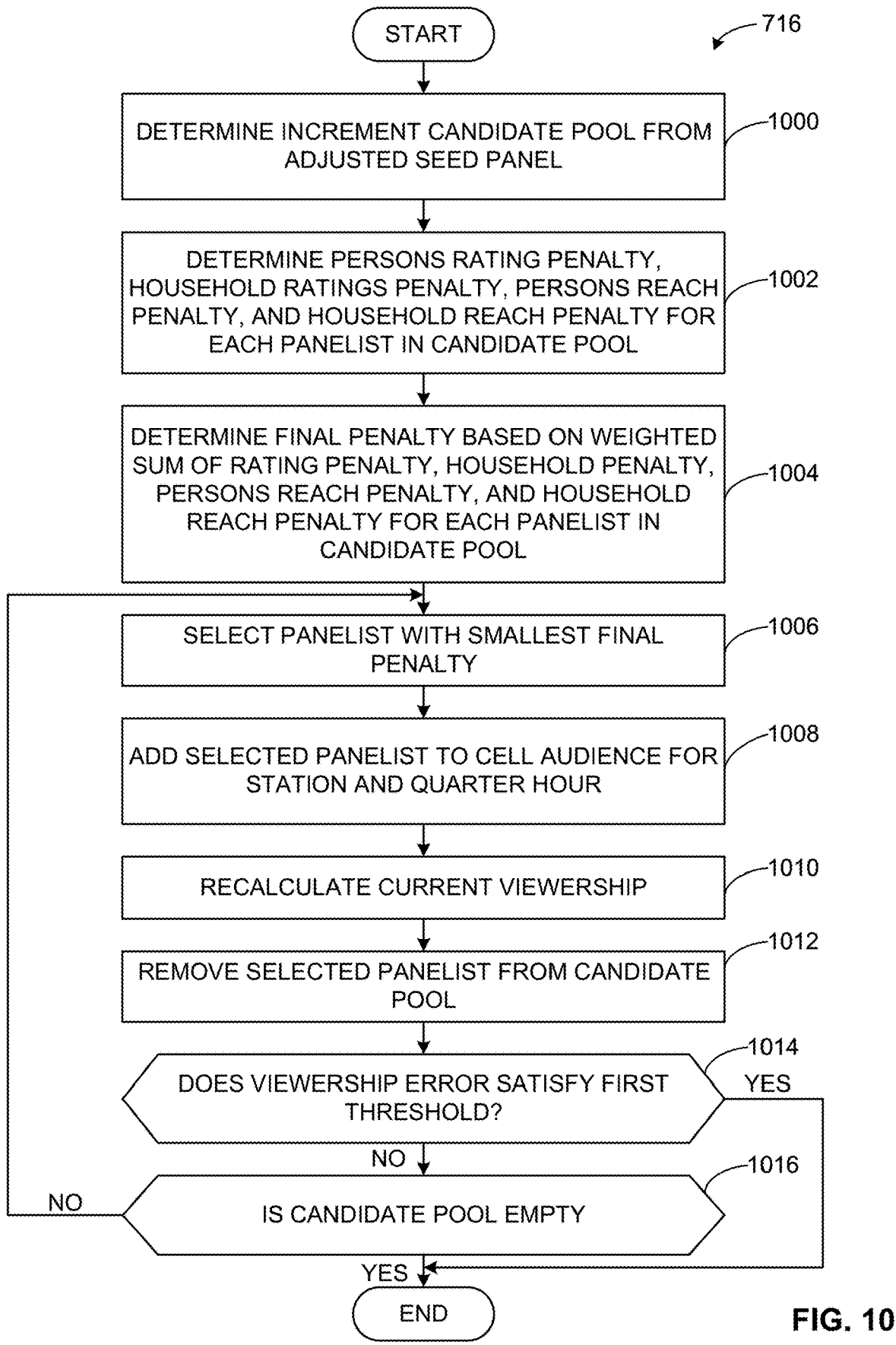

FIG. 10 is an example flowchart 716 representative of example machine readable instructions that may be executed to implement the example seed panel optimizer 128 of FIGS. 1 and 3 to increment viewership, as described above in conjunction with block 716 of FIG. 7. Although the instructions of FIG. 10 are described in conjunction with the example seed panel optimizer 128 of FIGS. 1 and 3, the example instructions may be utilized by any type of seed panel optimizer.

At block 1000, the example seed panelist data adjuster 308 determines an increment candidate pool from the adjusted seed panel. In some examples, the seed panelist data adjuster 308 includes adjusted seed panelists in the increment candidate pool when the adjusted seed panelists satisfy various conditions. Such conditions may include seed panelists corresponding to the demographic of the target rating, seed panelists not corresponding to the audience of the station and quarter hour of the target rating, seed panelists that have viewed less than a maximum number of stations in the quarter hour corresponding to the target rating, and/or seed panelists receivability includes the station corresponding to the target rating.

At block 1002, the example penalty determiner 306 determines the persons rating penalty, the household ratings penalty, the persons reach penalty, and the household reach penalty for each seed panelist in the increment candidate pool. The determinations of each penalty are described above in conjunction with Table 1. At block 1004, the example penalty determiner 306 determines the final penalty based on the weighted sum (e.g., weighted based on a coefficient) of the rating penalty, the household penalty, the persons reach penalty, and the household reach penalty for each seed panelist in the increment candidate pool. As described above in conjunction with FIG. 2, the coefficient for each penalty may be adjusted by a user at runtime, thereby affecting the weighted sum of the final penalty score.

At block 1006, the example seed panelist data adjuster 308 selects the panelist with the smallest final penalty. At block 1008, the example seed panelist data adjuster 308 adds the selected seed panelist to the cell audience (e.g., the audience corresponding to the target rating) for station and quarter hour, thereby reducing the viewership error. At block 1010, the example seed panelist data adjuster 308 recalculates the current viewership. At block 1012, the example seed panelist data adjuster 308 removes the seed panelist from the increment candidate pool. At block 1014, the example ratings/reach comparer 304 determines, based on the recalculated current viewership, if the viewership error satisfies the first threshold (e.g., the viewing threshold).

If the example rating/reach comparer 304 determines that the viewership error satisfies the first threshold (block 1014: YES), the process ends. If the example rating/reach comparer 304 determines that the viewership error does not satisfy the first threshold (block 1014: NO), the example seed panelist data adjuster 308 determines if the increment candidate pool is empty (block 1016). If the example seed panelist data adjuster 308 determines that the increment candidate pool is empty (block 1016: YES), the process ends. If the example seed panelist data adjuster 308 determines that the increment candidate pool is not empty (block 1016: NO), the process returns to block 1006 until the viewership error is sufficiently reduced or the increment candidate pool is empty.

Figure 11:
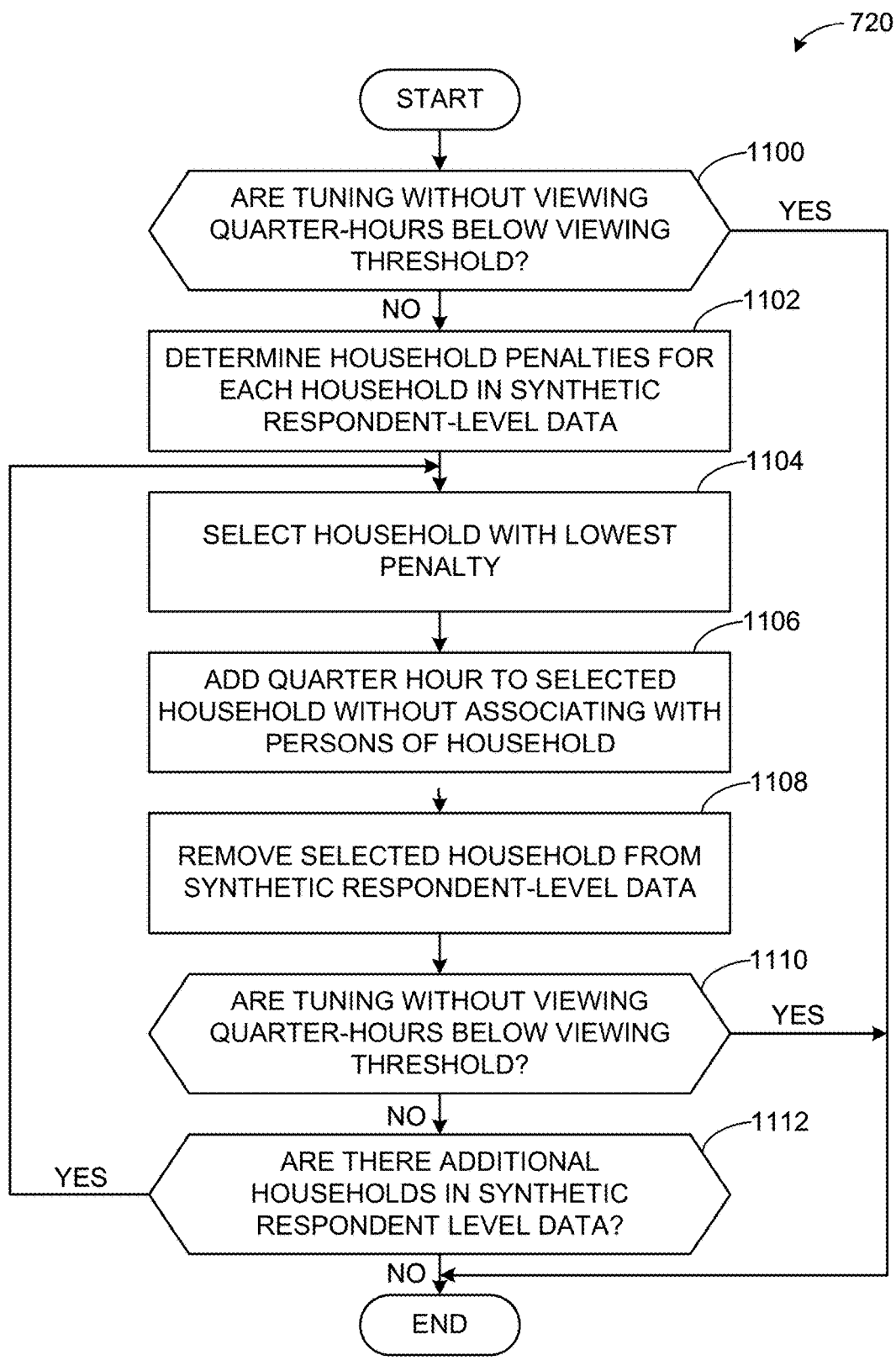

FIG. 11 is an example flowchart 720 representative of example machine readable instructions that may be executed to implement the example seed panel optimizer 128 of FIGS. 1 and 3 to generate tuning without viewing data, as described above in conjunction with block 720 of FIG. 7. Although the instructions of FIG. 11 are described in conjunction with the example seed panel optimizer 128 of FIGS. 1 and 3, the example instructions may be utilized by any type of seed panel optimizer.

At block 1100, the example rating/reach comparer 304 determines if tuning without viewing quarter hours are below the viewing threshold. Tuning without viewing is added to accurately reflect household rating targets in the final synthetic respondent level data in the example output file 130 by accounting for tuning without viewing situations. If the example ratings/reach comparer 304 determines that tuning without viewing quarter hours are below the viewing threshold (block 1100: YES), the example rating/reach comparer 304 determines that tuning without viewing does not need to be added to the respondent level data and the process ends.

If the example ratings/reach comparer 304 determines that tuning without viewing quarter hours are not below the viewing threshold (block 1100: NO), the example penalty determiner 306 determines the household penalties for each household in the synthetic respondent level data (e.g., corresponding to the households of the adjusted seed panel) (block 1102), as shown above in Table 1. At block 1104, the example household data adjuster 310 selects a household of the households in the synthetic respondent level data with the lowest penalty. At block 1106, the example household data adjuster 310 adds quarter hour(s) to the selected household without associating with persons of the household, as described above in conjunction with FIG. 3. At block 1108, the example household data adjuster 310 removes the selected household from the synthetic respondent level data.

At block 1110, the example ratings/reach comparer 304 determines if tuning without viewing quarter hours are below the viewing threshold. If the example ratings/reach comparer 304 determines that tuning without viewing quarter hours are below the viewing threshold (block 1110: YES), the example rating/reach comparer 304 determines that the respondent level data does not require further adjusting and the process ends. If the example ratings/reach comparer 304 determines that tuning without viewing quarter hours are not below the viewing threshold (block 1110: NO), the example household data adjuster 310 determines if there are additional households in the synthetic respondent level data (block 1112). If the example household data adjuster 310 determines that there are not additional households in synthetic respondent level data (block 1112: NO), the example process ends. If the example household data adjuster 310 determines that there are additional households in synthetic respondent level data (block 1112: YES), the example process returns to block 1104 to continue to adjust household quarter hours until the tuning without viewing quarter hours are below the viewing threshold and/or there are no more additional household in the synthetics respondent level data.

Figure 12:
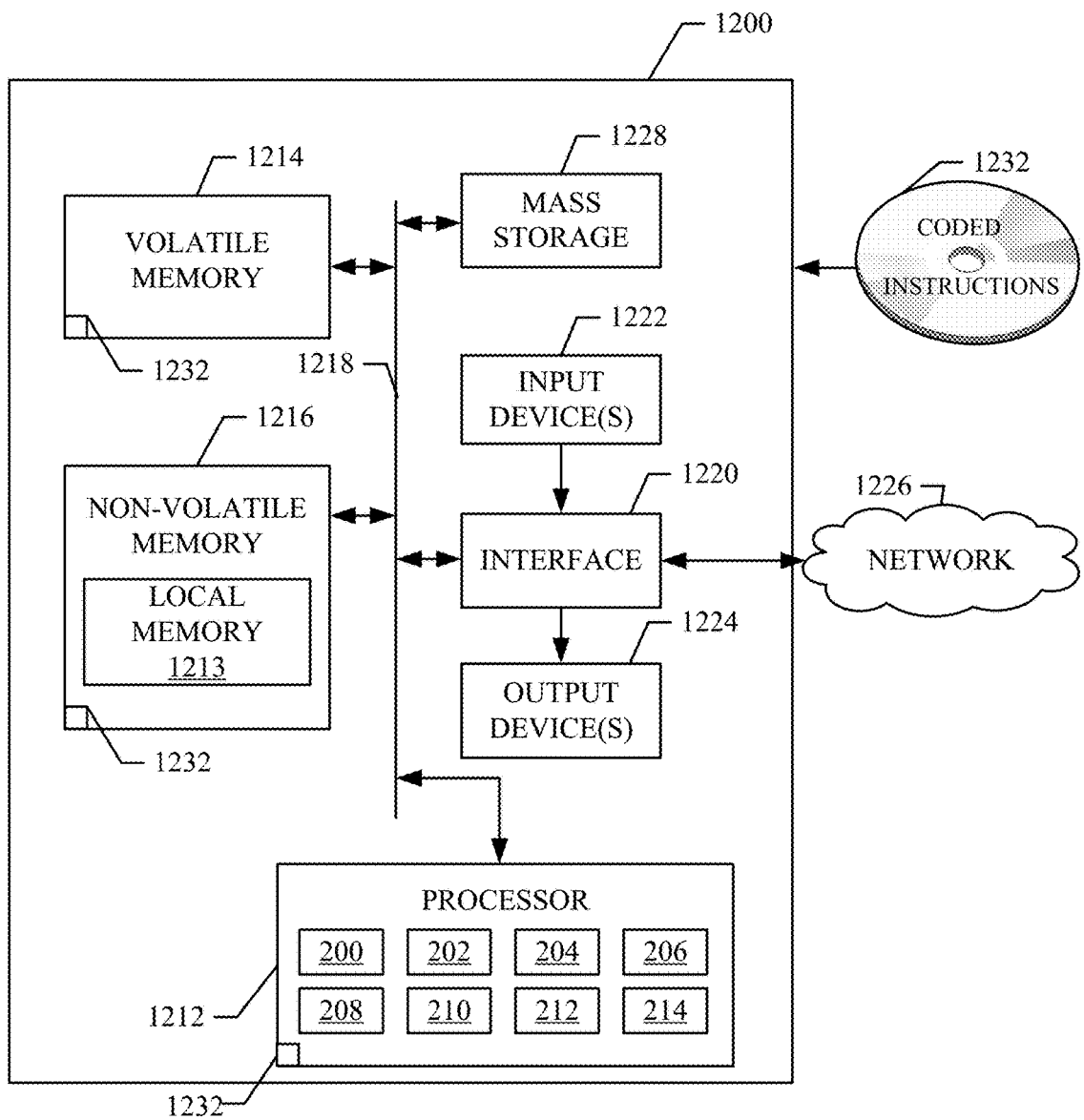
FIG. 12 is a block diagram of an example processing system structured to execute the example machine readable instructions of FIGS. 4-6 to implement the example seed panel generator of FIGS. 1 and/or 2.

FIG. 12 is a block diagram of an example processor platform 1200 capable of executing the instructions of FIGS. 3-5 to implement the example seed panel generator 122 of FIG. 1. The processor platform 1200 can be, for example, a server, a personal computer, a mobile device (e.g., a cell phone, a smart phone, a tablet such as an iPad™), a personal digital assistant (PDA), an Internet appliance, or any other type of computing device.

The processor platform 1200 of the illustrated example includes a processor 1212. The processor 1212 of the illustrated example is hardware. For example, the processor 1212 can be implemented by integrated circuits, logic circuits, microprocessors or controllers from any desired family or manufacturer.

The processor 1212 of the illustrated example includes a local memory 1213 (e.g., a cache). The example processor 1212 of FIG. 12 executes the instructions of FIGS. 4-6 to the example interface(s) 200, the example data assigner 202, the example station translator 204, the example attributes filter 206, the example weighter 208, the example viewing donator 210, and/or the example seed panelist replicator 212 to implement the example seed panel generator 122 of FIG. 2. The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 1220 of the illustrated example, thus, typically includes a graphics driver card, a graphics driver circuit or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIGS. 4-6 may be stored in the mass storage device 1228, in the volatile memory 1214, in the non-volatile memory 1216, and/or on a removable tangible computer readable storage medium such as a CD or DVD.

Figure 13:
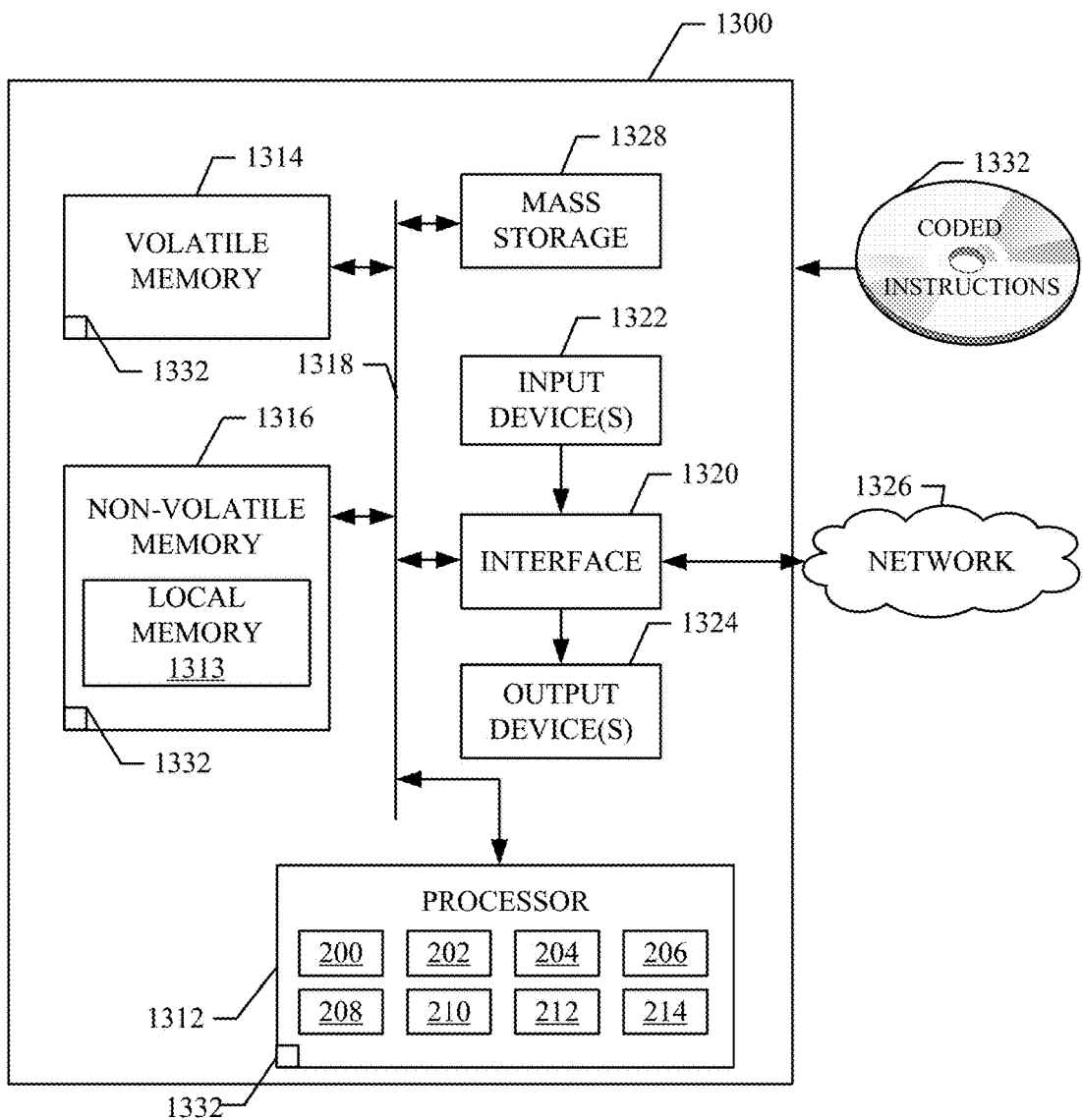
FIG. 13 is a block diagram of an example processing system structured to execute the example machine readable instructions of FIGS. 7-11 to implement the example seed panel generator of FIGS. 1 and/or 3.

FIG. 13 is a block diagram of an example processor platform 1300 capable of executing the instructions of FIGS. 7-11 to implement the example seed panel generator 132 of FIG. 1. The processor platform 1300 can be, for example, a server, a personal computer, a mobile device (e.g., a cell phone, a smart phone, a tablet such as an iPad™), a personal digital assistant (PDA), an Internet appliance, or any other type of computing device.

The processor platform 1300 of the illustrated example includes a processor 1312. The processor 1312 of the illustrated example is hardware. For example, the processor 1312 can be implemented by integrated circuits, logic circuits, microprocessors or controllers from any desired family or manufacturer.

The processor 1312 of the illustrated example includes a local memory 1313 (e.g., a cache). The example processor 1312 of FIG. 13 executes the instructions of FIGS. 7-11 to the example interface(s) 300, the example constraint determiner 302, the example rating/reach comparer 304, the example penalty determiner 306, the example seed panelist data adjuster 308, the example household data adjuster 310, and/or the example file generator 312 to implement the example seed panel optimizer 128 of FIG. 3. The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 1320 of the illustrated example, thus, typically includes a graphics driver card, a graphics driver circuit or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

The coded instructions 1332 of FIGS. 6-11 may be stored in the mass storage device 1328, in the volatile memory 1314, in the non-volatile memory 1316, and/or on a removable tangible computer readable storage medium such as a CD or DVD.

From the foregoing, it should be appreciated that the above disclosed methods, apparatus, and articles of manufacture generate synthetic respondent level data. Example disclosed herein process the collected and/or aggregated metering data for markets where a panel is maintained and collect and/or aggregate return path data for markets where a panel is not maintained to generate a seed panel. Once a seed panel has been generated, examples disclosed herein adjusts the seed panel to satisfy target ratings and/or target reach. Using examples disclosed herein, consistent respondent level data is generated that satisfy various targets, thereby providing more accurate universe estimations.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
   at least one memory;
   instructions; and
   programmable circuitry to execute the instructions to:
   identify locations corresponding to monitored panelists;
   when a first one of the identified locations corresponds to an affiliate, assign first data of households in the first one of the identified locations to the affiliate;
   generate a seed panel, the seed panel to include at least one of the monitored panelists selected based on a population associated with return path data; and
   donate second data associated with a donor pool of first panelists to second panelists included in the seed panel, the second panelists associated with faulty media monitoring equipment.

2. The apparatus of claim 1, wherein the first data is at least one of tuning data or viewing data of the households.

3. The apparatus of claim 1, wherein the programmable circuitry is to assign at least one of geography data or income data to the return path data based on demographics associated with the population.

4. The apparatus of claim 3, wherein the programmable circuitry is to:
  select a first group of the monitored panelists to be seed panelists based on a comparison of the monitored panelists and the at least one of the geography data or the income data assigned to the return path data; and
  weight the seed panelists based on a universe estimate of media users.

5. The apparatus of claim 1, wherein the programmable circuitry is to at least one of replicate or down-sample seed panelists.

6. The apparatus of claim 1, wherein the programmable circuitry to:
  compare a target rating to a computed rating determined based on the seed panel; and
  adjust the seed panel based on the comparison to reduce an error between the target rating and the computed rating.

7. An apparatus comprising:
  station translation circuitry to:
    identify locations corresponding to monitored panelists; and
    when a first one of the identified locations corresponds to an affiliate, assign first data of households in the first one of the identified locations to the affiliate; and
  seed panel generation circuitry to:
    generate a seed panel, the seed panel to include at least one of the monitored panelists selected based on a population associated with return path data; and
    donate second data associated with a donor pool of first panelists to second panelists included in the seed panel when the second panelists are included in the seed panel, the second panelists associated with faulty media monitoring equipment.

8. The apparatus of claim 7, wherein the first data is at least one of tuning data or viewing data of the households.

9. The apparatus of claim 7, wherein the seed panel generation circuitry is to assign at least one of geography data or income data to the return path data based on demographics associated with the population.

10. The apparatus of claim 9, wherein the seed panel generation circuitry is to:
  select a first group of the monitored panelists to be seed panelists based on a comparison of the monitored panelists and the at least one of the geography data or the income data assigned to the return path data; and
  weight the seed panelists based on a universe estimate of media users.

11. The apparatus of claim 7, wherein the seed panel generation circuitry is to at least one of replicate or down-sample seed panelists.

12. The apparatus of claim 7, further including seed panel optimization circuitry to:
  compare a target rating to a computed rating determined based on the seed panel; and
  adjust the seed panel based on the comparison to reduce an error between the target rating and the computed rating.

13. A non-transitory computer readable medium comprising instructions which, when executed, cause one or more processors to at least:
  identify locations corresponding to monitored panelists;
  when a first one of the identified locations corresponds to an affiliate, assign first data of households in the first one of the identified locations to the affiliate;
  generate a seed panel, the seed panel to include at least one of the monitored panelists selected based on a population associated with return path data; and
  donate second data associated with a donor pool of first panelists to second panelists included in the seed panel when the second panelists are included in the seed panel, the second panelists corresponds to faulty media monitoring equipment.

14. The non-transitory computer readable medium of claim 13, wherein the first data is at least one of tuning data or viewing data of the households.

15. The non-transitory computer readable medium of claim 13, wherein the instructions cause the one or more processors to assign at least one of geography data or income data to the return path data based on demographics associated with the population.

16. The non-transitory computer readable medium of claim 15, wherein the instructions cause the one or more processors to:
  select a first group of the monitored panelists to be seed panelists based on a comparison of the monitored panelists and the at least one of the geography data or the income data assigned to the return path data; and
  weight the seed panelists based on a universe estimate of media users.

17. The non-transitory computer readable medium of claim 15, wherein the instructions cause the one or more processors to at least one of replicate or down-sample seed panelists.

18. A method comprising:
  identifying, by executing instructions with one or more processors, locations corresponding to monitored panelists;
  when a first one of the identified locations corresponds to an affiliate, ascribing, by executing instructions with the one or more processors, first data of households in the first one of the identified locations to the affiliate;
  generating, by executing instructions with the one or more processors, a seed panel, the seed panel to include at least one of the monitored panelists selected based on a population associated with return path data; and
  donating, by executing instructions with the one or more processors, second data associated with a donor pool of first panelists to second panelists included in the seed panel when the second panelists are included in the seed panel, the second panelists corresponds to faulty media monitoring equipment.

19. The method of claim 18, further including assigning at least one of geography data or income data to the return path data based on demographics associated with the population.

20. The method of claim 19, further including:
  selecting a first group of the monitored panelists to be seed panelists based on a comparison of the monitored panelists and the at least one of the geography data or the income data assigned to the return path data; and
  weighting the seed panelists based on a universe estimate of media users.

* * * * *